US008548815B2

(12) United States Patent
Chivukula et al.

(10) Patent No.: US 8,548,815 B2
(45) Date of Patent: Oct. 1, 2013

(54) EFFICIENT DESIGN OF MDCT / IMDCT FILTERBANKS FOR SPEECH AND AUDIO CODING APPLICATIONS

(75) Inventors: Ravi Kiran Chivukula, San Diego, CA (US); Yuriy Reznik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1154 days.

(21) Appl. No.: 12/212,920

(22) Filed: Sep. 18, 2008

(65) Prior Publication Data

US 2009/0094038 A1    Apr. 9, 2009

Related U.S. Application Data

(60) Provisional application No. 60/973,709, filed on Sep. 19, 2007, provisional application No. 60/989,400, filed on Nov. 20, 2007.

(51) Int. Cl.
*G10L 21/00* (2013.01)

(52) U.S. Cl.
USPC ............... 704/500; 704/203; 375/240.18

(58) Field of Classification Search
USPC .................. 704/203, 500; 375/240.18
See application file for complete search history.

(56) References Cited

U.S. PATENT DOCUMENTS

| | | | |
|---|---|---|---|
| 6,154,762 A | 11/2000 | Malvar | |
| 2004/0196986 A1 | 10/2004 | Nam | |
| 2004/0220805 A1 | 11/2004 | Geiger et al. | |
| 2005/0154597 A1 | 7/2005 | Kim | |
| 2008/0052066 A1 | 2/2008 | Oshikiri et al. | |
| 2008/0249765 A1* | 10/2008 | Schuijers | 704/203 |
| 2009/0228290 A1* | 9/2009 | Chen et al. | 704/500 |
| 2010/0250265 A1* | 9/2010 | Taleb | 704/503 |

FOREIGN PATENT DOCUMENTS

| | | |
|---|---|---|
| CA | 2066471 A1 | 10/1992 |
| CN | 1909382 A | 2/2007 |
| JP | 2005196198 A | 7/2005 |

(Continued)

OTHER PUBLICATIONS

Mu-Huo Cheng, et al.: "Fast IMDCT and MDCT Algorithims—A Matrix Approach," IEEE Transactions on Signal Processing, IEEE Service Center, New York, NY, US, vol. 51, No. 1 (Jan. 1, 2003) XP011080318 ISSN: 1053-587X.

(Continued)

*Primary Examiner* — Daniel D Abebe
(74) *Attorney, Agent, or Firm* — Espartaco Diaz Hidalgo

(57) ABSTRACT

A more efficient encoder/decoder is provided in which an N-point MDCT transform is mapped into smaller sized N/2-point DCT-IV and/or DCT-II transforms with isolated pre-multiplications which can be moved to a prior or subsequent windowing stage. That is, the windowing operations may be merged with first/last stage multiplications in the core MDCT/IMDCT functions, respectively, thus reducing the total number of multiplications. Additionally, the MDCT may be systematically decimated by factor of 2 by utilizing a uniformly scaled 5-point DCT-II core function as opposed to the DCT-IV or FFT cores used in many existing MDCT designs in audio codecs. The modified windowing stage merges factors from a transform stage and windowing stage to obtain piece-wise symmetric windowing factors, which can be represented by a sub-set of the piece-wise symmetric windowing factors to save storage space. Such features offer appreciable reduction in complexity and less memory usage than the prior art.

50 Claims, 15 Drawing Sheets

(56) References Cited

FOREIGN PATENT DOCUMENTS

| | | |
|---|---|---|
| RU | 2131169 | 5/1999 |
| TW | 530465 B | 5/2003 |
| TW | 594674 B | 6/2004 |
| TW | 200417990 | 9/2004 |
| TW | 200516545 | 5/2005 |
| WO | WO9642071 A2 | 12/1996 |
| WO | WO0159603 A1 | 8/2001 |
| WO | 2004080125 A1 | 9/2004 |
| WO | 2005031595 A1 | 4/2005 |
| WO | 2005031596 A1 | 4/2005 |
| WO | 2006049204 A1 | 5/2006 |

OTHER PUBLICATIONS

Hi-Seok Kim, et al.: "A new optimized algorithm for computation of MDCT and its inverse transform," Intelligent Signal Processing and Communication Systems, 2004. ISPACS 2004. Proceedings of 2004 International Symposium on Seoul, Korea Nov. 18-19, 2004, Piscataway, NJ, USA, IEEE, pp. 528-530 (Nov. 18, 2004) XP010806152 ISBN: 978-0-7803-8639-6.

Malvar, H.: "Fast algorithms for orthogonal and biorthogonal modulated lapped transforms," Advances in Digital Filtering and Signal Processing, 1998 IEEE Symposium on Victoria, BC, Canada Jun. 5-6, 1998, New York, NY, USA, IEEE, US, pp. 159-163 (Jun. 5, 1998) XP010289010 ISBN: 978-0-7803-4957-5.

Kok, C.W.: "Fast Algorithm for Computing Discrete Cosine Transform," IEEE Transactions on Signal Processing, IEEE Service Center, New York, NY, US, vol. 45, No. 3 (Mar. 1, 1997) XP011057726 ISSN: 1053-587X.

Heideman, M.T.: "Computation of an Odd-Length DCT from a Real-Valued DFT of the Same Length," IEEE Transactions on Signal Processing, IEEE Service Center, New York, NY, US, vol. 40, No. 1, pp. 54-64 (Jan. 1, 1992) XP000270173 ISSN: 1053-587X.

Silverman, H. F.: "An introduction to programming the Winograd Fourier transform algorithm (WFTA)," IEEE Transactions on Acoustics, Speech and Signal Processing, IEEE Inc. New York, USA, vol. 25, No. 2, pp. 152-165 (Apr. 1, 1977) XP002470750 ISSN: 0096-3518.

Silverman, H.F.:Corrections and Addendum to "An Introduction to Programming the Winograd Fourier Transform Algorithm (WFTA)," IEEE Transactions on Acoustics, Speech and Signal Processing. vol. assp-26, No. 3, p. 268 (Jun. 1, 1978) XP002508334.

Vladimir Britanak, et al.: "An Efficient Implementation of the Forward and Inverse MDCT in MPEG Audio Coding," IEEE Signal Processing Letters, IEEE Service Center, Piscataway, NJ, US, vol. 8, No. 2 (Feb. 1, 2001) XP011059705 ISSN: 1070-9908.

Ravi K. Chivukula, et al.: "Efficient implementation of a class of MDCT/IMDCT filterbanks for speech and audio coding applications," Acoustics, Speech and Signal Processing, 2008. ICASSP 2008. IEEE International Conference on, IEEE, Piscataway, NJ, USA.

Chivukula, et al.: "Fast algorithms for MDCT and Low Delay Filterbanks Used in Audio Coding," Master of Science in Engineering (Online) (Aug. 8, 2008) Department of Electrical Engineering, The University of Texas at Arlington, Retrieved from the Internet: URL:http://dspace.uta.edu/handle/10106/921 (retrieved on Dec. 9, 2008).

International Search Report, PCT/US2008/077129—International Search Authority—European Patent Office, Apr. 1, 2009.

Written Opinion, PCT/US2008/077129—International Search Authority—European Patent Office. Apr. 1, 2009.

Taiwan Search Report—TW097136172—TIPO—Jul. 14, 2012.

\* cited by examiner

EFFICIENT DESIGN OF MDCT / IMDCT FILTERBANKS FOR SPEECH AND AUDIO CODING APPLICATIONS

CLAIM OF PRIORITY UNDER 35 U.S.C. §119

The present application for patent claims priority to U.S. Provisional Application No. 60/973,709 entitled "Design of Fast MDCT/IMDCT Module for G.VBR Codec" filed Sep. 19, 2007, and U.S. Provisional Application No. 60/989,400 entitled "Design of Fixed-Point MDCT/IMDCT Module for G.VBR Codec" filed Nov. 20, 2007, both assigned to the assignee hereof and hereby expressly incorporated by reference herein.

BACKGROUND

1. Field

The following description generally relates to encoders and decoders and, in particular, to an efficient MDCT/IMDCT implementation for voice and audio codecs.

2. Background

One goal of audio coding is to compress an audio signal into a desired limited information quantity while keeping as much as the original sound quality as possible. In an encoding process, an audio signal in a time domain is transformed into a frequency domain, and a corresponding decoding process reverses such operation.

As part of such an encoding process, a signal may be processed by a modified discrete cosine transform (MDCT). The modified discrete cosine transform (MDCT) is a Fourier-related transform based on the type-IV discrete cosine transform (DCT-IV), with the additional property that blocks are overlapped so that the ending of one block coincides with the beginning of the next block. This overlapping helps to avoid aliasing artifacts, and in addition to the energy-compaction qualities of the DCT, makes the MDCT especially attractive for signal compression applications.

MDCT transform has also found applications in speech compression. ITU-T G.722.1 and G.722.1C vocoders apply MDCT on input speech signal, while more recent ITU-T G.729.1 and G.718 algorithms use it to process residual signal, remaining after the use of Code Excited Linear Prediction (CELP) encoder. The above mentioned vocoders operate with input sampling rates of either 8 kHz or 16 kHz, and 10 or 20-millisecond frames. Hence, their MDCT filterbanks are either 160 or 320-point transforms.

However, if future speech coders will support block-switching functionality support for decimated sizes (160, 80, 40-points) may also be needed.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An encoding method and/or device are provided for computing transform values. Time-domain input values representing an audio signal are received. A modified windowing function may be produced or obtained that merges factors from the transform operation and the windowing operation to obtain piece-wise symmetric windowing factors. A subset of the piece-wise symmetric windowing factors are stored from which a complete set of the piece-wise symmetric windowing factors can be reconstructed. The stored subset of the piece-wise symmetric windowing factors may include at least half of the unique factors for each piece-wise symmetric set of windowing factors. Prior to transforming the input values, the complete set of reconstructed piece-wise symmetric windowing factors may be applied to the input values. The input values may be transformed into spectral coefficients using a Modified Discrete Cosine Transform (MDCT) that is recursively split into at least one of a Discrete Cosine Transform type IV (DCT-IV), a Discrete Cosine Transform type II (DCT-II), or both the DCT-IV and DCT-II, where each such transform is of smaller dimension than the MDCT, wherein at least some multiplication operations of the MDCT are merged with a prior windowing operation applied to the input values. The DCT-II may be a 5-point transform that can implement MDCTs of different sizes. The MDCT may implement at least two of 320, 160, 80, 40-point transforms using the same DCT-II. For fixed-point implementations, dynamic range estimation and renormalization on the outputs from the windowing function may also be performed.

A decoding method and/or device are provided for computing transform values. Spectral coefficients representing an audio signal are received. The spectral coefficients may be transformed into time-domain output values using an Inverse Modified Discrete Cosine Transform (IMDCT) that is recursively split into at least one of an Inverse Discrete Cosine Transform type IV (IDCT-IV), an Inverse Discrete Cosine Transform type II (IDCT-II), or both the IDCT-IV and IDCT-II, where each such inverse transform is of smaller dimension than the IMDCT, wherein at least some multiplication operations of the IMDCT are merged with a subsequent windowing operation applied to the output values. For instance, the IDCT-II is a 5-point inverse transform that implements IMDCTs of different sizes. The IMDCT may implement at least two of 320, 160, 80, 40-point inverse transforms using the same core IDCT-II. Additionally, a modified windowing function may be produced that merges factors from the transform operation and the windowing operation to obtain piece-wise symmetric windowing factors. A subset of the piece-wise symmetric windowing factors may be stored from which a complete set of the piece-wise symmetric windowing factors can be reconstructed. The stored subset of the piece-wise symmetric windowing factors includes at least half of the unique factors for each piece-wise symmetric set of windowing factors. The complete set of reconstructed piece-wise symmetric windowing factors may be applied to the output values after transforming the spectral coefficients. For fixed-point implementations, dynamic range estimation and renormalization may be performed on the outputs from the windowing function.

Yet another example proves a method and/or device for performing a windowing operation. A modified windowing function may be produced that merges factors from a transform stage and windowing stage to obtain piece-wise symmetric windowing factors. The piece-wise symmetric windowing factors may be split to obtain the subset of the piece-wise symmetric windowing factors and reduce the overall number of unique factors. The subset of the piece-wise symmetric windowing factors may be stored from which a complete set of the piece-wise symmetric windowing factors can be reconstructed. The stored subset of the piece-wise symmetric windowing factors includes at least half of the unique factors for each piece-wise symmetric set of windowing factors. Subsequently, input values representing an audio signal may be received. The complete set of reconstructed piece-wise symmetric windowing factors may be applied to the input values to provide windowed output values.

In one example, the windowing stage may occur before the transform stage. The transform stage may implement a Modified Discrete Cosine Transform (MDCT) that is recursively split into at least one of a Discrete Cosine Transform type IV (DCT IV), a Discrete Cosine Transform type IV (DCT IV), or both the DCT IV and DCT II, where each such transform is of smaller dimension than the MDCT. The transform stage factors may be the cosine factors.

In another example, the windowing stage may occur after the transform stage. The transform stage may implement an Inverse Modified Discrete Cosine Transform (IMDCT) that is recursively split into at least one of an Inverse Discrete Cosine Transform type IV (IDCT IV), an Inverse Discrete Cosine Transform type IV (IDCT IV), or both the IDCT IV and IDCT II, where each such transform is of smaller dimension than the IMDCT.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
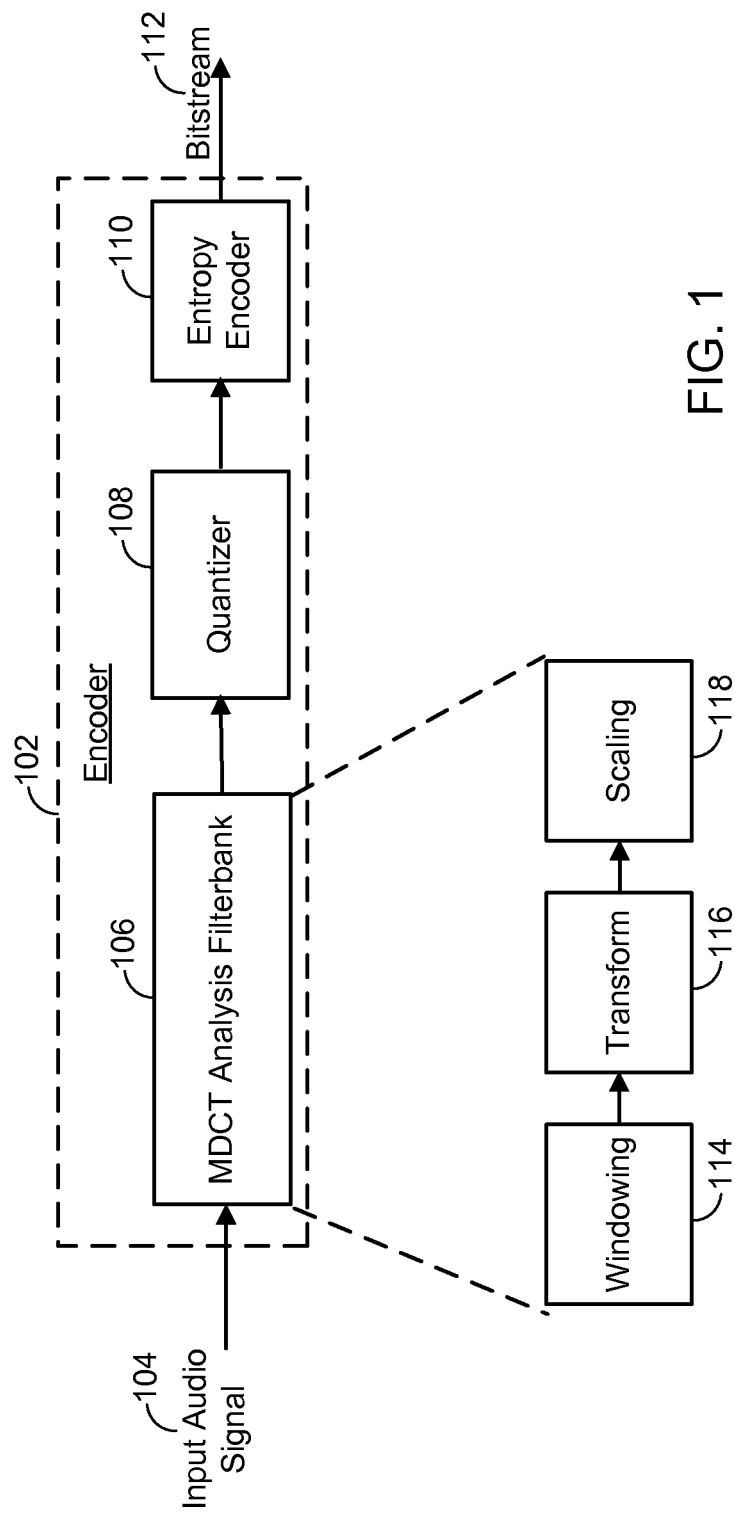
FIG. 1 is a block diagram illustrating an example of an encoder that may include an MDCT analysis filterbank.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Overview

One feature provides for implementing an N-point MDCT transform by mapping it into smaller sized N/2-point DCT-IV and DCT-II transforms with isolated pre-multiplications which can be moved to the subsequent windowing stage. That is, the windowing operations may be merged with first/last stage multiplications in the core MDCT/IMDCT functions, respectively, thus reducing the total number of multiplications. Additionally, the MDCT may be systematically decimated by factor of 2 by utilizing a uniformly scaled 5-point DCT-II core function (using at most 5 non-trivial multiplications) as opposed to the DCT-IV or FFT cores used in many existing MDCT designs in audio codecs.

The modified windowing stage provides piece-wise symmetric factors which can be stored using half the factors. Such features offer appreciable reduction in complexity and less memory usage than the prior art.

Codec Structure

FIG. 1 is a block diagram illustrating an example of an encoder that may include an MDCT analysis filterbank. The encoder 102 may receive an input audio signal 104. An MDCT Analysis Filterbank 106 (i.e., modified discrete cosine transform based on the type-IV discrete cosine transform) operates to decompose the time-domain input audio signal 104 into a plurality of sub-band signals and convert the signals to the frequency-domain, where each sub-band signal is converted into a transform coefficient per sub-band per block. The resulting signal is then quantized by a Quantizer 108 and encoded by an Entropy Encoder 110 to produce a bitstream 112 of the digitized audio signal. According to one example, the MDCT Analysis Filterbank 106 may be implemented by a windowing function 114, a transform 116 (e.g., time-domain to frequency domain), and/or a scaling function 118. The MDCT Analysis Filterbank 106, including the windowing function 114, transform 116, and/or scaling function 116, may be implemented in hardware (e.g., as a processor, circuit, programmable logic device, etc.), software (e.g., instructions executable by a processor), and/or a combination thereof.

Figure 2:
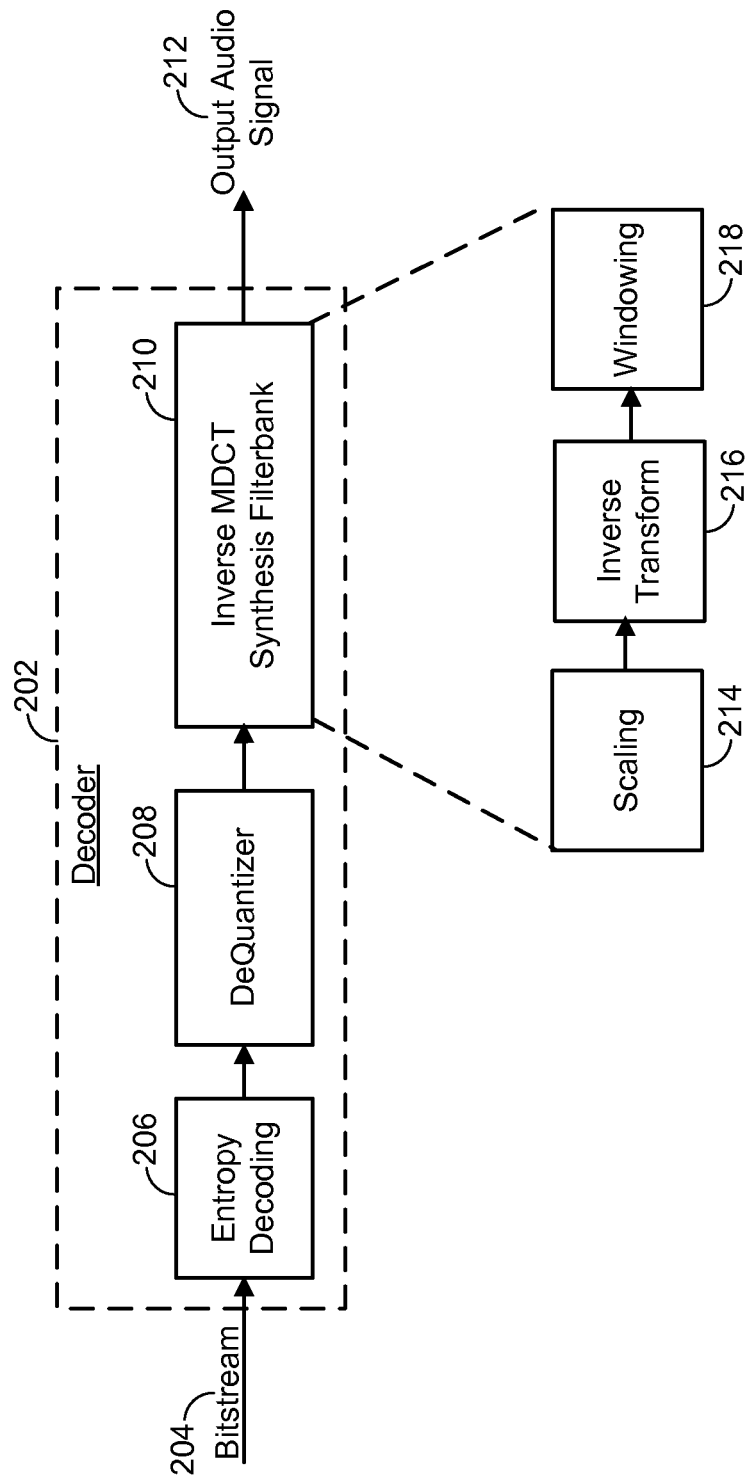
FIG. 2 is a block diagram illustrating an example of a decoder that may implement include an IMDCT synthesis filterbank.

FIG. 2 is a block diagram illustrating an example of a decoder that may implement include an IMDCT synthesis filterbank. The decoder 202 may receive a bitstream 204. An Entropy Decoder 206 decodes the bitstream 204 which is then dequantized by a Dequantizer 208 to produce a frequency-domain signal. An IMDCT Synthesis Filterbank 210 (i.e., inverse modified discrete cosine transform based on the type-IV discrete cosine transform) operates to convert the frequency-domain signal 104 back to a time-domain audio signal 212. The IMDCT Synthesis Filterbank 210 may reverse the operations of the MDCT Analysis Filterbank 106. According to one example, the IMDCT Synthesis Filterbank 210 may be implemented by a scaling function 214, an inverse transform 216 (e.g., frequency domain to time-domain), and a windowing plus overlap and add function 218. The IMDCT Synthesis Filterbank 210, including the scaling function 214, inverse transform 216, and/or windowing function 218, may be implemented in hardware (e.g., as a processor, circuit, programmable logic device, etc.), software (e.g., instructions executable by a processor), and/or a combination thereof.

Implementing MDCT Using DCT-IV and DCT-II

According to a feature, the transform 116 (FIG. 1) and inverse transform 216 (FIG. 2) may be decimated and implemented by one or more DCT-IV (and IDCT-IV) transforms which can be implemented as one or more DCT-II (and IDCT-II) transforms, respectively.

A Modified Discrete Cosine Transform (MDCT) can be defined by:

$$X(k) = \sum_{n=0}^{N-1} x(n)\cos\left(\frac{\pi}{2N}\left(2n+1+\frac{N}{2}\right)(2k+1)\right), \quad \text{(Equation 1)}$$

$$k = 0, 1, \ldots, N/2 - 1$$

Similarly, the Inverse MDCT (IMDCT) can be defined by:

$$\hat{x}(n) = \sum_{n=0}^{N/2-1} X(k)\cos\left(\frac{\pi}{2N}\left(2n+1+\frac{N}{2}\right)(2k+1)\right), \quad \text{(Equation 2)}$$

$$n = 0, 1, \ldots, N - 1.$$

where $\{x(n)$, for $n=0, 1, \ldots N-1$, represents the input sequence of samples, N denotes the frame length, X(k) is the resulting MDCT coefficients, and $\hat{x}(n)$ represents the reconstructed outputs.

Using matrix notation, the MDCT transform can be represented by a matrix M:

$$M(i, j) = \cos\left(\frac{\pi}{2N}\left(2j+1+\frac{N}{2}\right)(2i+1)\right), \quad \text{(Equation 3)}$$

where $i = 0, 1, \ldots, N/2 - 1;$ $j = 0, 1, \ldots, N - 1.$

Consequently, $X=Mx$ and $\hat{x}=M^T X$, where x represents a matrix of input samples $[x(0), \ldots, x(N-1)]^T$, X represents a matrix of resulting MDCT coefficients $$\left[X(0), \ldots, X\left(\frac{N}{2}-1\right)\right]^T,$$

and $\hat{x}$ represents a matrix of reconstructed outputs $[\hat{x}(0), \ldots, \hat{x}(N-1)]^T$.

In order to implement the MDCT transform, it may be mapped into an N/2-point DCT-IV core function. For example, the transform 116 of FIG. 1 may be implemented as one or more N/2-point DCT-IV transforms.

A DCT-IV transform can be defined as:

$$C_k^{IV} = X(k) = \frac{2}{N}\sum_{n=0}^{N-1} x(n)\cos\left(\frac{\pi}{4N}(2n+1)(2k+1)\right), \quad \text{(Equation 4)}$$

$$k = 0, 1, \ldots, N - 1.$$

Meanwhile, an IDCT-IV transform can be defined as:

$$x(n) = \sum_{k=0}^{N-1} C_k^{IV}\cos\left(\frac{\pi}{4N}(2n+1)(2k+1)\right), \quad \text{(Equation 5)}$$

$$n = 0, 1, \ldots, N - 1.$$

The MDCT transform can be mapped to an N/2—point DCT-IV transform as $$M^T = PSC_{N/0.2}^{IV}; \quad \text{(Equation 6)}$$

and the IMDCT transform can be mapped to an N/2-point IDCT-IV transform as $$M = C_{N/.2}^{IV} SP^T \quad \text{(Equation 7)}$$

where $$P = \begin{bmatrix} 0 & I_{N/4} \\ 0 & -J_{N/4} \\ J_{N/4} & 0 \\ I_{N/4} & 0 \end{bmatrix} \quad \text{(Equation 8)}$$

where $I_{N/4}$ is an N/4×N/4 identity matrix and $J_{N/4}$ is an N/4×N/4 order reversal matrix, and matrix S is defined as $$S = \begin{bmatrix} -I_{N/4} & 0 \\ 0 & I_{N/4} \end{bmatrix}, \quad \text{(Equation 9)}$$

and $C_{N/0.2}^{IV}$ is an N/2×N/2 DCT-IV matrix that can be defined as $$C_{N/.2}^{IV}(i, j) = \cos\left(\frac{\pi}{2N}(2j+1)(2i+1)\right), \quad \text{(Equation 10)}$$

$$i, j = 0, 1, \ldots, N/2 - 1$$

By using the symmetry and involutory properties of the DCT-IV matrix, it can be mapped into a DCT-II transform. The DCT-II transform may be defined as:

$$C_k^{II} = X(k) = \frac{\lambda(k)}{2}\sum_{n=0}^{N-1} x(n)\cos\left(\frac{(2n+1)k\pi}{2N}\right), \quad \text{(Equation 11)}$$

$$k = 0, 1, \ldots, N - 1.$$

Likewise, an IDCT-II transform may be defined as:

$$x(n) = \sum_{k=0}^{N-1} \frac{\lambda(k)}{2} C_k^{II} \cos\left(\frac{(2n+1)k\pi}{2N}\right), \quad \text{(Equation 12)}$$

$$n = 0, 1, \ldots, N - 1.$$

where $\lambda(k)=1\sqrt{2}$, if k=0, otherwise 1.

Figure 3:
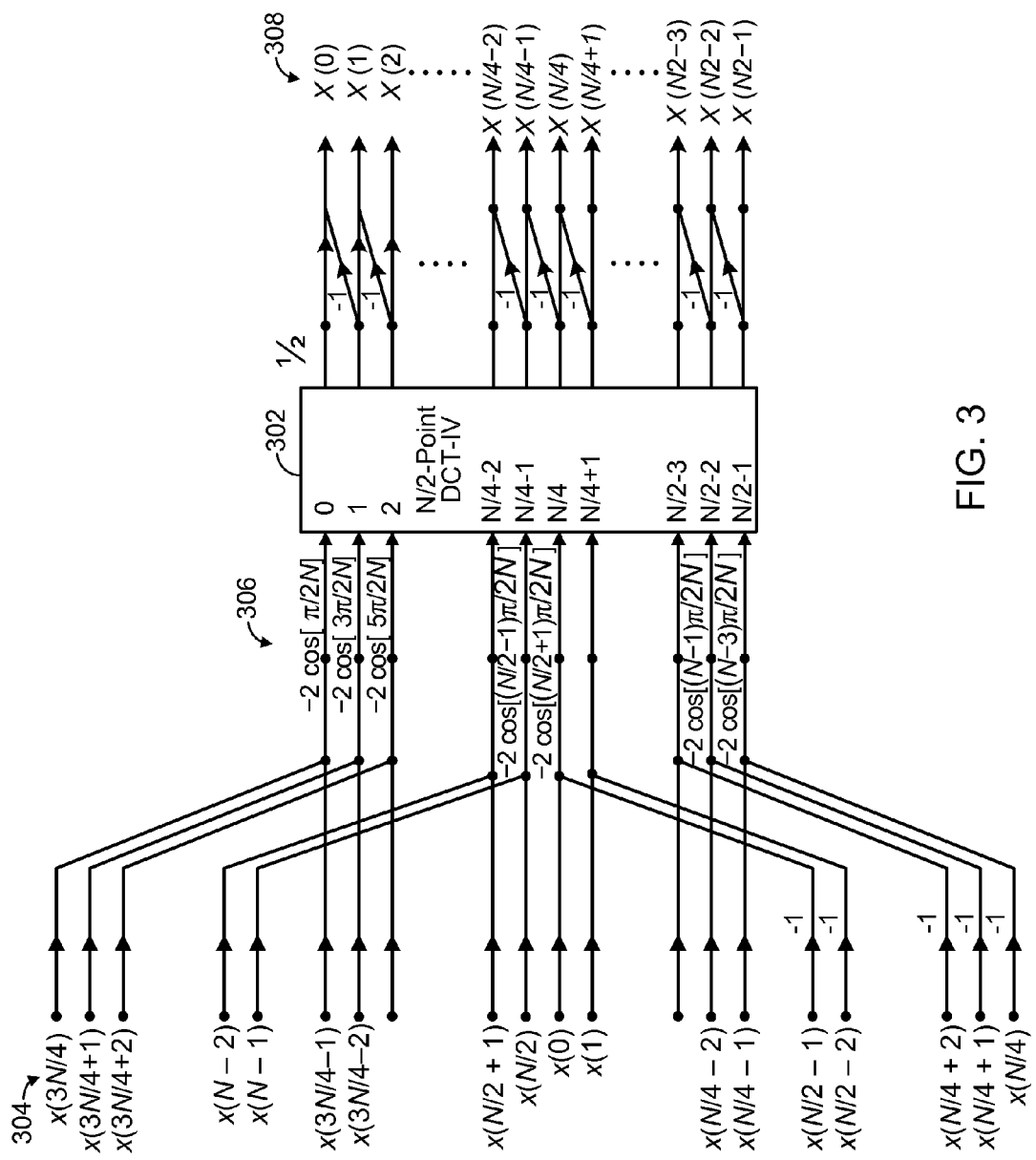
FIG. 3 illustrates how the MDCT transform may be implemented based on the N/2-point DCT-IV core function.

FIG. 3 illustrates how the MDCT transform may be implemented based on the N/2-point DCT-IV core function. The MDCT transform may be implemented as part of an encoder that transforms time-domain input samples into frequency-domain output samples. For an input sequence X(3N/4) to X(N/4) 304, an MDCT transform can be represented by cosine factors 306 followed by a DCT-IV transform 302 to produce outputs 308. As discusses below, the cosine factors 306 can be absorbed into a prior windowing stage/function within an encoder.

Figure 4:
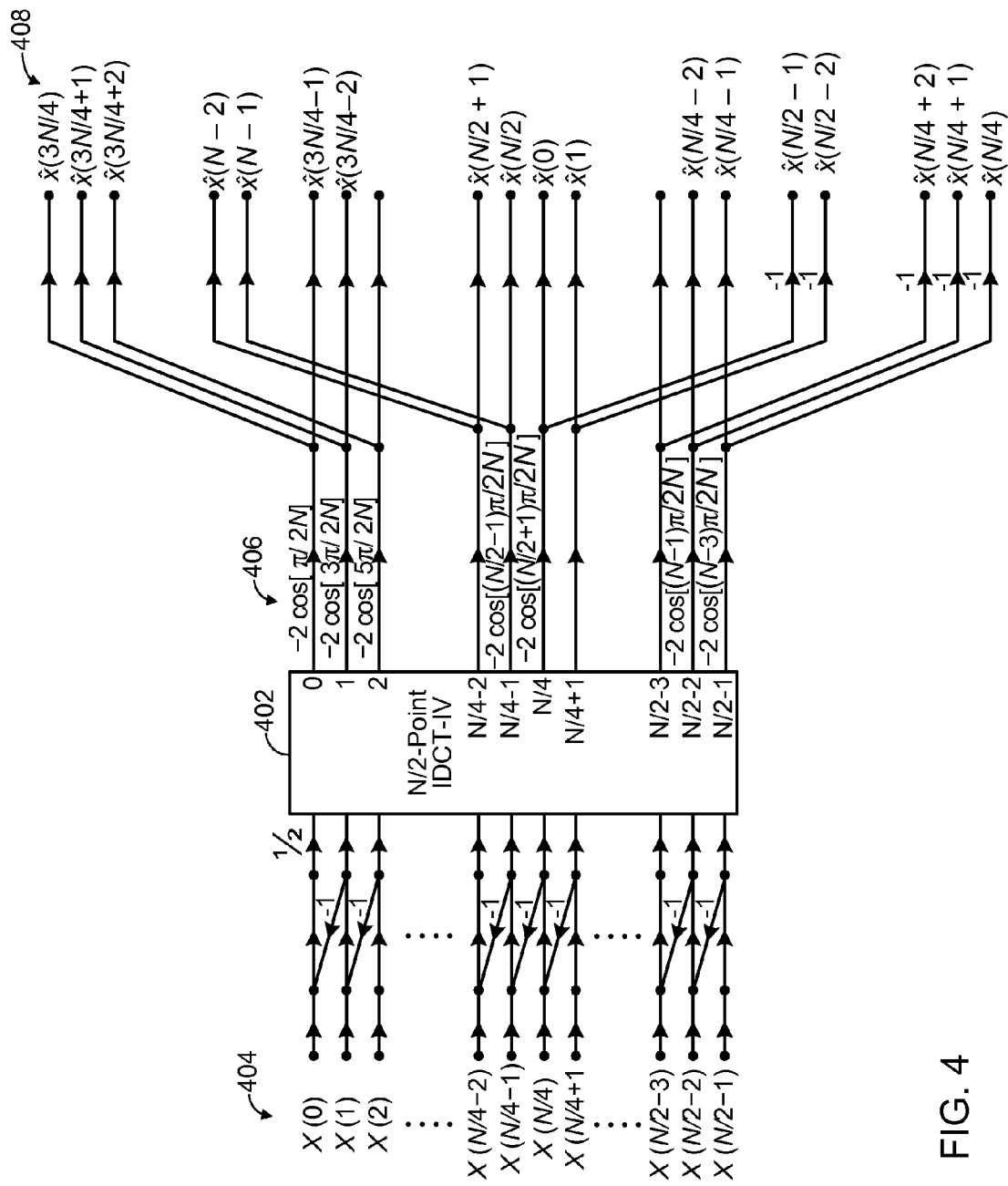
FIG. 4 illustrates how an IMDCT transform may be implemented based on the N/2-point IDCT-IV core function.

Similarly, FIG. 4 illustrates how an IMDCT transform may be implemented based on the N/2-point IDCT-IV core function. The IMDCT transform may be implemented as part of a decoder that transforms frequency-domain input samples into time-domain output samples. For an input sequence X(0) to X(N/2−1) 404, an IMDCT transform can be represented by an IDCT-IV transform 402 followed by cosine factors 406 to produce outputs 408. As discusses below, the cosine factors 406 can be absorbed into a subsequent windowing stage/function within a decoder. Note that the IMDCT mapping and cosine factors illustrated in FIG. 4 serve to reverse the operations of the MDCT mapping (FIG. 3) assuming the same windowing function is used at both the encoder and decoder.

The use of cosine factors 306 and 406 in both of these mappings (FIGS. 3 and 4) provide for numerical stability at zero or near zero values, which is something not achievable with other types of factors (e.g., inverse cosine factors).

Note that the inputs to the MDCT and IMDCT transforms may be processed as frames or blocks having a plurality of data points. Consequently, in order for a vocoder (e.g., G.VBR codec) to support data blocks having frame lengths smaller than 320, transforms of decimated sizes are needed. For blocks having a frame length of 160, 80, 40, etc., it is observed that these sizes are all multiples of 5. Therefore, the last non-reduceable (by decimation techniques) block size could use a transform of size 5. It is observed that, in terms of decimation techniques, it is much more efficient to design a 5-point DCT-II transform than either DCT-IV or FFF transforms.

The DCT-IV transform may be mapped to the DCT-II transform as $$C_{N/0.2}^{IV} = D(C_{N/0.2}^{II})^T L^T \quad \text{(Equation 13)}$$

where D is a diagonal matrix with elements $$D(i, j) = 2\cos\left(\frac{\pi}{2N}(2i+1)\right), i = 0, 1, \ldots, N/2-1, \quad \text{(Equation 14)}$$

$$L = \begin{bmatrix} 0.5 & 0 & 0 & 0 & \ldots & 0 \\ -0.5 & 1 & 0 & 0 & \ldots & 0 \\ 0.5 & -1 & 1 & 0 & \ldots & 0 \\ -0.5 & 1 & -1 & 1 & \ldots & 0 \\ \vdots & \vdots & \vdots & \vdots & \ddots & \vdots \\ -0.5 & 1 & -1 & 1 & \ldots & 1 \end{bmatrix}, \quad \text{(Equation 15)}$$

and $C_{N/2}^{II}$ may be an N/2×N/2 DCT-II matrix defined as $$C_{N/2}^{II}(i, j) = \cos\left(\frac{\pi}{N}(2i+1)j\right), \quad \text{(Equation 16)}$$

$$i, j = 0, 1, \ldots, N/2-1.$$

Figure 5:
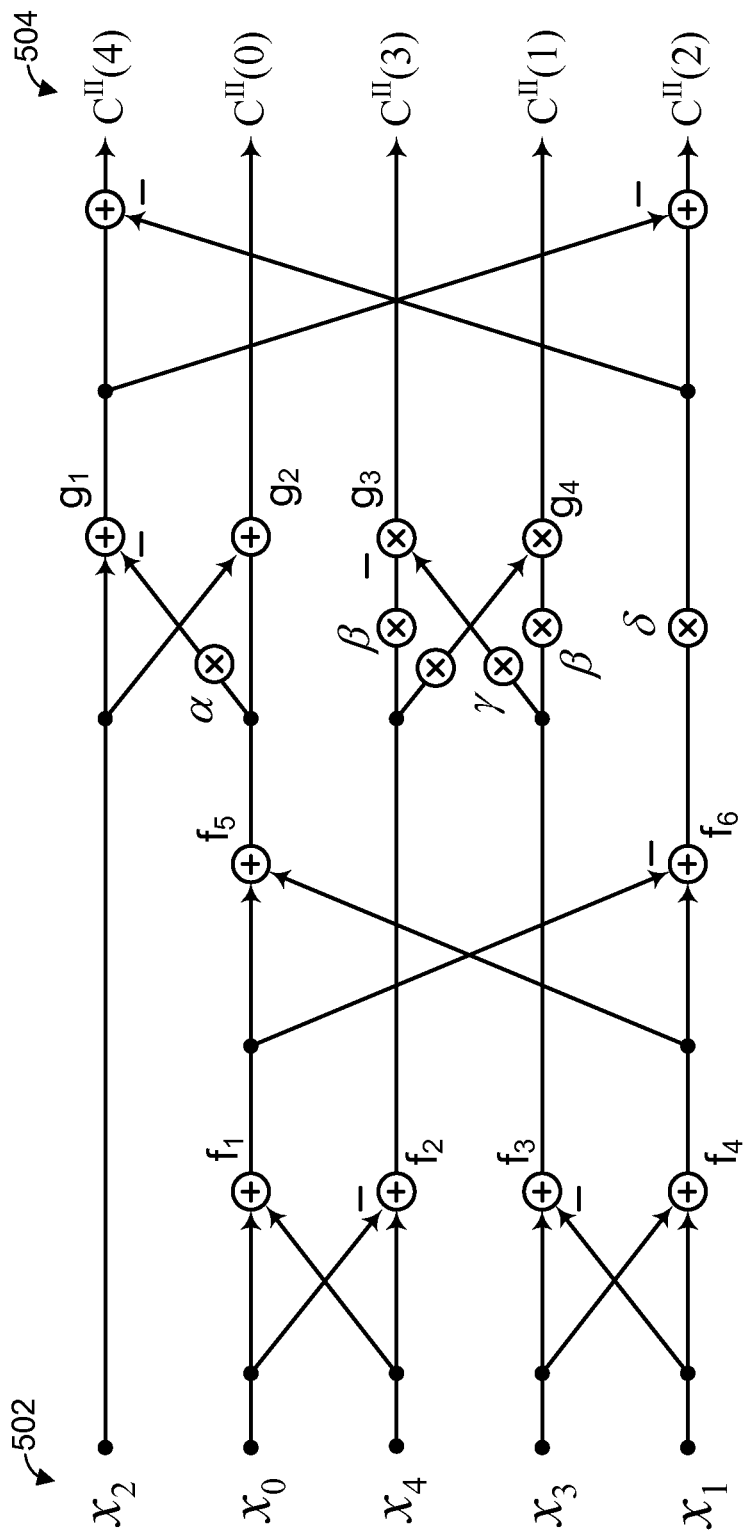
FIG. 5 is a diagram illustrating a 5-point DCT-II transform that may be implemented as part of an encoder MDCT transform.

FIG. 5 is a diagram illustrating a factorization of a 5-point DCT-II transform that may be implemented as part of an encoder MDCT transform. Note that factor α in this transform is a dyadic rational, and so multiplication by it is just a binary shift operation. This 5-point transform can be implemented either using planar rotation and 5 multiplications or by using 4 multiplications by factorizing planar rotation or using lifting steps. For a 5-point sequence of inputs x 502, the outputs $C^{II}$ 504 for the 5-point DCT-II transform can be generated using 4 non-trivial multiplications and 13 additions or 5 multiplications and 13 additions. The DCT-II transform outputs $C^{II}$ are generated as:

$$\alpha = \frac{1}{4}; \quad \beta = \cos\left(\frac{3\pi}{10}\right); \quad \gamma = -\cos\left(\frac{\pi}{10}\right); \quad \delta = -\frac{\sqrt{5}}{4}$$

$$f_1 = x(0) + x(4); \quad f_2 = x(4) - x(0)$$
$$f_3 = x(3) - x(1); \quad f_4 = x(3) + x(1)$$
$$f_5 = f_1 + f_4; \quad f_6 = f_4 - f_1$$
$$g_1 = x(2) - \alpha f_5; \quad g_2 = x(2) + f_5$$
$$g_3 = \beta f_2 + \gamma f_3; \quad g_4 = \beta f_3 - \gamma f_2$$
$$C^{II}(0) = g_2; \quad C^{II}(1) = g_4; \quad C^{II}(2)\delta f_6 - g_1$$
$$C^{II}(3) = g_3; \quad C^{II}(4) = g_1 - \delta f_6$$

Figure 6:
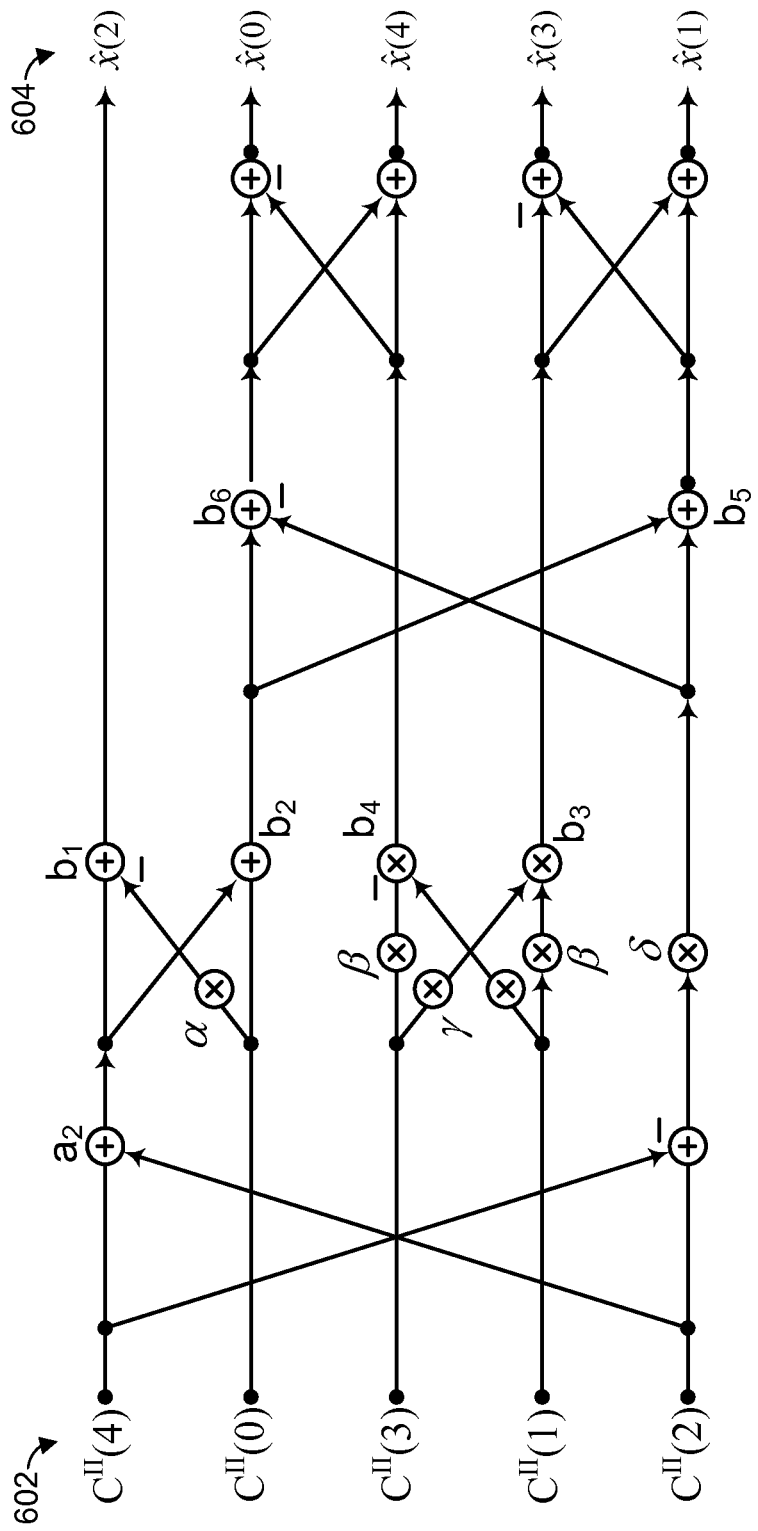
FIG. 6 is a diagram illustrating a 5-point IDCT-II transform that may be implemented as part of a decoder IMDCT transform.

FIG. 6 is a diagram illustrating a 5-point IDCT-II transform that may be implemented as part of a decoder IMDCT transform. That is, this IDCT-II transform may be used to implement the IDCT-IV transform (FIG. 4) for a decoder IMDCT transform. It can be implemented either using planar rotation and 5 multiplications or by using 4 multiplications by factorizing planar rotation or using lifting steps. For a 5-point sequence of inputs $C^{II}$ 602, the outputs $\hat{x}$ 604 for the 5-point IDCT-II transform can be generated using 4 non-trivial multiplications and 13 additions or 5 non-trivial multiplications and 12 additions as illustrated. The IDCT-II transform outputs $\hat{x}$ are generated as:

$$\alpha = \frac{1}{4}; \quad \beta = \cos\left(\frac{3\pi}{10}\right); \quad \gamma = -\cos\left(\frac{\pi}{10}\right); \quad \delta = -\frac{\sqrt{5}}{4}$$

$$a_1 = C^{II}(2) + C^{II}(4); \quad a_2 = C^{II}(4) - C^{II}(2)$$
$$b_1 = C^{II}(0) + a_2; \quad b_2 = C^{II}(0) - \alpha a_2$$
$$b_3 = \beta C^{II}(1) + \gamma C^{II}(3); \quad b_4 = -\beta C^{II}(3) + \gamma C^{II}(1)$$
$$b_5 = b_2 + \delta a_1; \quad b_6 = b_2 - \delta a_1$$
$$\hat{x}(0) = b_6 - b_4; \quad \hat{x}(1) = b_3 + b_5; \quad \hat{x}(2) = b_1$$
$$\hat{x}(3) = b_5 - b_3; \quad \hat{x}(4) = b_4 + b_6$$

Figure 7:
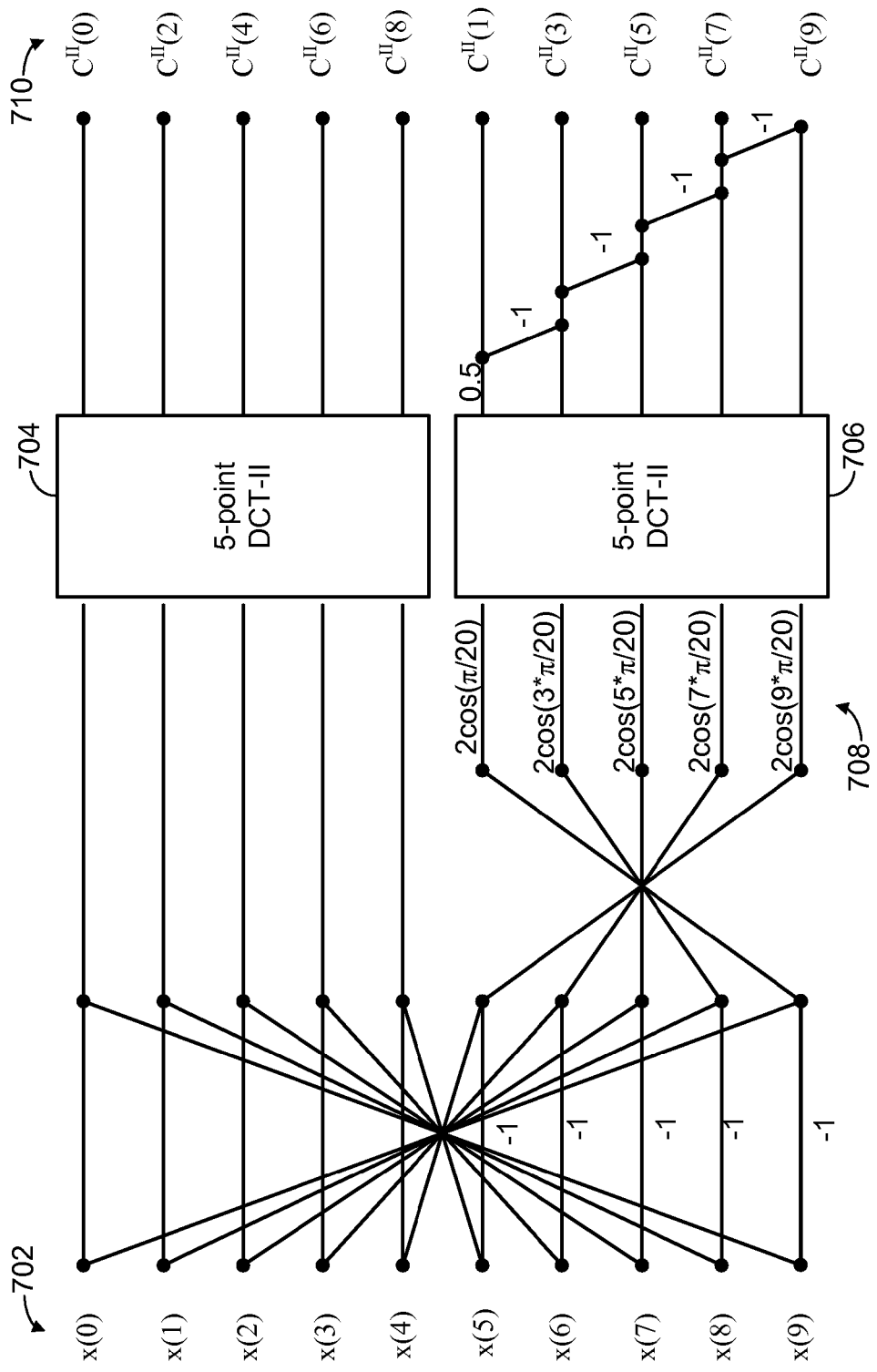
FIG. 7 is a block diagram illustrating an example of how a DCT-IV transform of length N=10 points can be implemented using two DCT-II transforms.

FIG. 7 is a block diagram illustrating an example of how a DCT-IV transform of length N=10 points can be implemented using two DCT-II transforms (N=5 points). For a sequence of ten input points x(0), . . . , x(9) 702, the 10-point DCT-IV transform can be implemented by two 5-point DCT-II transforms 704 and 706 and factors 708 to produce output coefficients $C^{II}(0), \ldots, C^{II}(9)$ 710. In this manner, a core 5-point DCT-II transform may be used to implemented transforms capable processing frame lengths of 160, 80, 40, etc.

Figure 8:
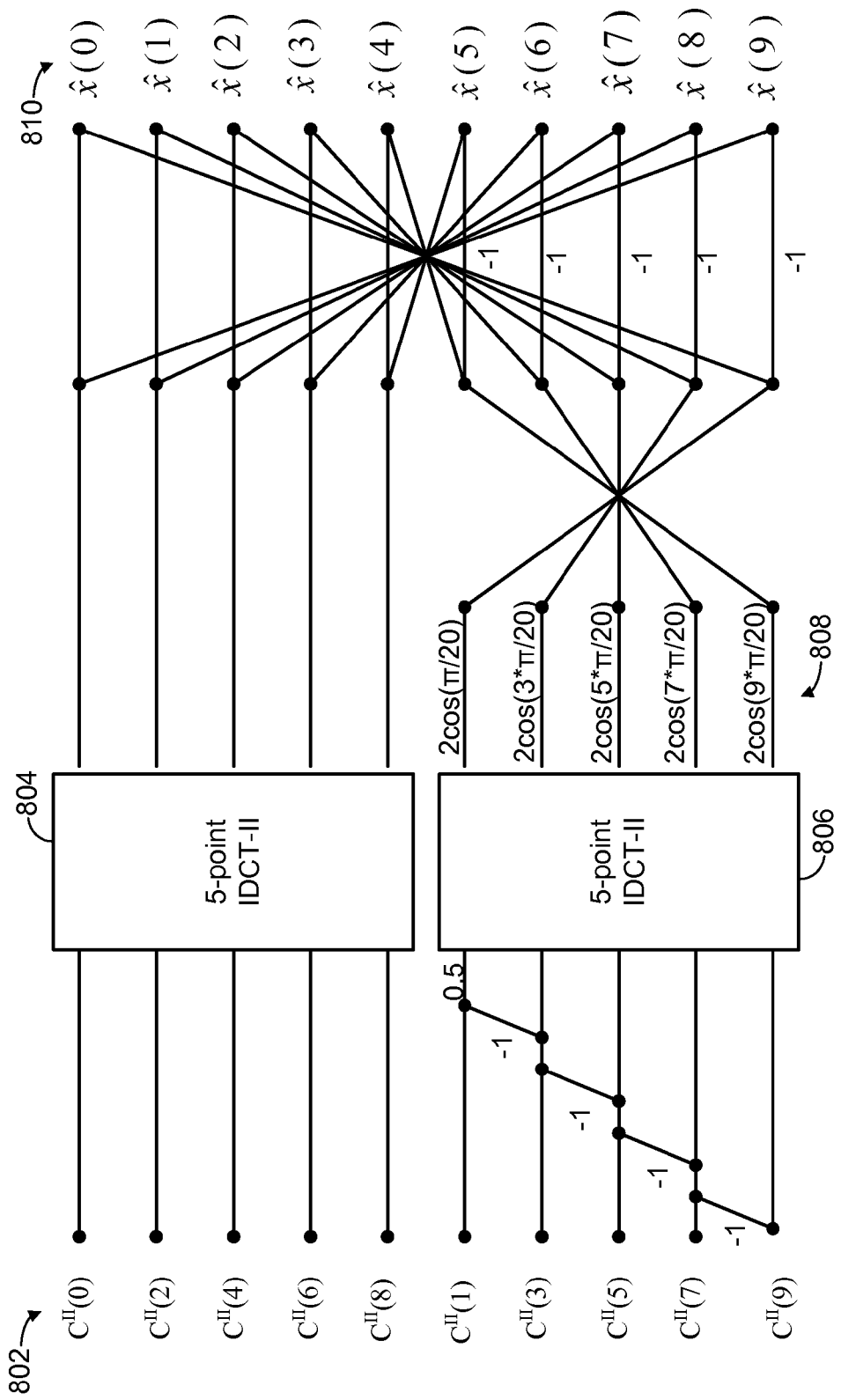
FIG. 8 is a block diagram illustrating an example of how an IDCT-IV transform of length N=10 points can be implemented using two IDCT-II transforms.

FIG. 8 is a block diagram illustrating an example of how an IDCT-IV transform of length N=10 points can be implemented using two IDCT-II transforms (N=5 points). For a sequence of ten input points $C^{II}(0), \ldots, C^{II}(9)$ 802, the 10-point IDCT-IV transform can be implemented by two 5-point DCT-II transforms 804 and 806 and factors 808 to produce output coefficients $\hat{x}(0), \ldots, \hat{x}(9)$ 810. In this manner, a core 5-point IDCT-II transform may be used to implemented transforms capable processing frame lengths of 160, 80, 40, etc.

Merging Multiplication Factors into Windowing Stage

The MDCT transform is often used in voice and audio coding algorithms (such as a G.VBR codec) and is essentially a scaled MDCT combined with windowing function h(n):

$$F(k) = \sum_{n=0}^{2N-1} f(n)h(n)\sqrt{\frac{2}{N}} \cos\frac{(2k+1)\pi}{4N}\frac{(2n+N+1)}{},$$ (Equation 17)

$k = 0, \ldots, N-1.$ where f(n) denotes input data samples, h(n) is a windowing function, and F(k) denotes the output MDCT spectrum coefficients. For example, the window function h(n) may be a sinusoidal function:

$$h(n) = \sin\frac{(2n+1)\pi}{4N}.$$ (Equation 18)

As previously discussed, the pre-multiplications factors (e.g., 306 in FIG. 3) involved mapping an DCT-IV transform to an MDCT transform, as well as the post-multiplication factors (e.g., 406 in FIG. 4) involved in mapping an IDCT-IV transform to an IMDCT transform, can be merged into their respective windowing stage. For example, the windowing function may be a sinusoidal function defined, for example, as:

$$h(n) = \sin\frac{(2n+1)\pi}{4N}$$ (Equation 19)

The combination of this windowing function h(n) and the transform factors produces the modified window function:

$$w(n) = \begin{bmatrix} 2\cos\left(\frac{\pi}{2N}\left(2n+1+\frac{N}{2}\right)\right)\sin\left(\frac{\pi(2n+1)}{2N}\right), & n = 0, 1, \ldots, \frac{N}{4} - 1 \\ -2\cos\left(\frac{\pi}{2N}\left(2n+1+\frac{N}{2}\right)\right)\sin\left(\frac{\pi(2n+1)}{2N}\right), & n = \frac{N}{4}, \ldots, N - 1 \end{bmatrix}$$ (Equation 20)

For $0 \le n < N/4$:

$$w\left(\frac{N}{4} - 1 - n\right) = w(n)$$ (Equation 21)
$$= 2\cos\left(\frac{\pi}{2N}\left(2n+1+\frac{N}{2}\right)\right)\sin\left(\frac{\pi(2n+1)}{2N}\right).$$

For $N/4 \le n < 3N/4$:

$$w\left(n + \frac{N}{4}\right) = w(N - 1 - n)$$ (Equation 22)
$$= 2\sin\left(\frac{\pi}{2N}\left(2n+1+\frac{N}{2}\right)\right)\sin\left(\frac{\pi(2n+1)}{2N}\right).$$

These merged or combined windowing factors may be pre-calculated and/or stored. In the case of the cosine factors 306 in FIG. 3 and 406 in FIG. 4, these provide piece-wise factors once merged. Consequently, for the modified window function, just a subset (e.g., half) of the factors need be stored. During windowing operations on values, the subset of stored factors can be retrieved and used according to their piece-wise symmetric properties.

Figure 9:
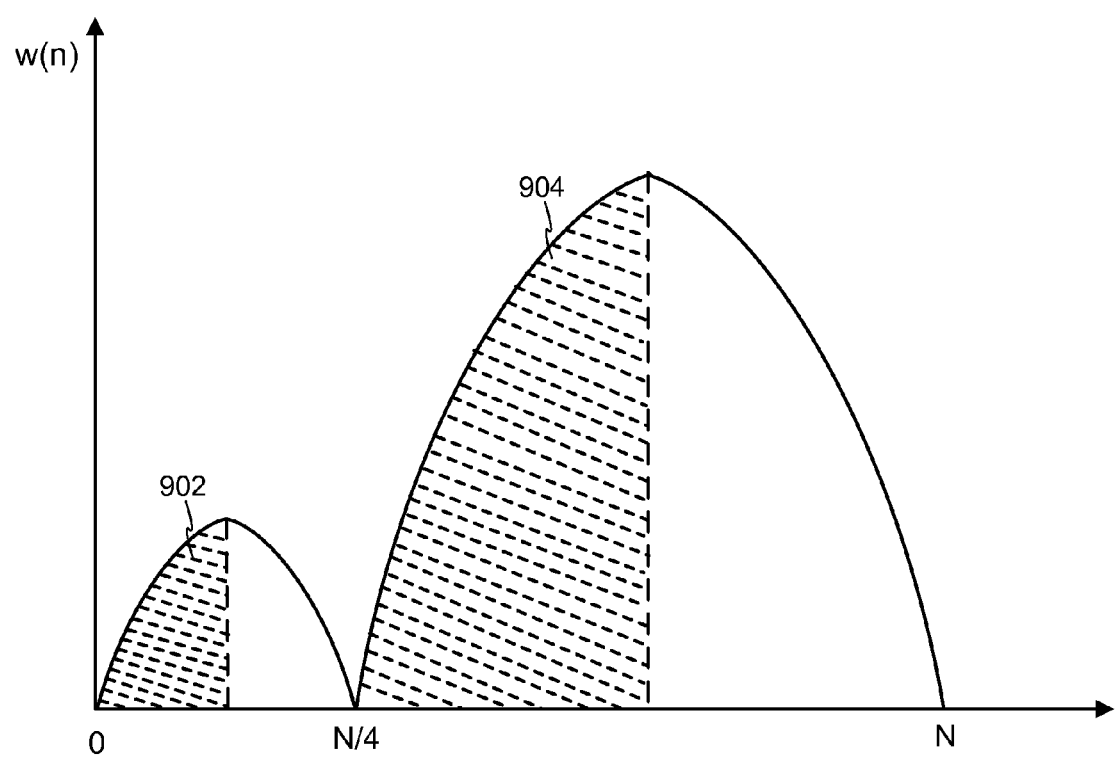
FIG. 9 is a graph illustrating the piece-wise symmetric nature of the window function.

FIG. 9 is a graph illustrating the piece-wise symmetric nature of the window function (of Equation 20). Compared to a symmetrical sine window, the windowing factors can be stored using the same amount of memory since only half of the windowing factors 902 and 904 are stored. In this example, for N=640 samples/factors and the illustrated piece-wise symmetric window, a first set of 160 samples (i.e., 0 to N/4−1) may be represented by just the first 80 samples or factors 902 since this is a symmetric portion. Likewise, a second set of 480 samples/factors (i.e., N/4 to N) may be represented by just the first 240 samples or factors 904. Consequently, just half of the factors are stored, thereby saving memory space. Additionally, this reduction of sample points may also result in faster processing since it reduces the number of memory accesses used to retrieve the windowing factors.

Example of Encoding Using MDCT Transform

Figure 10:
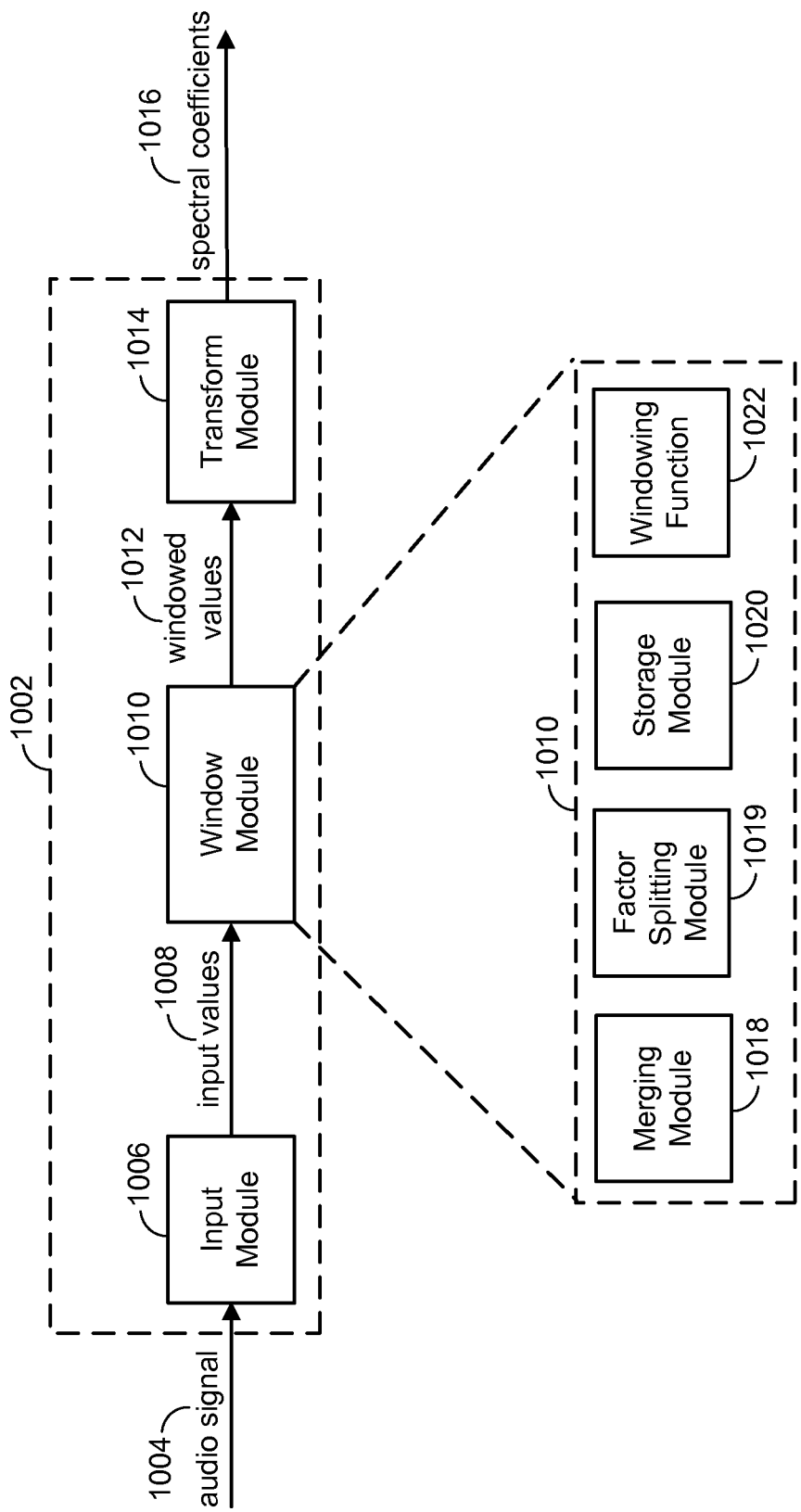
FIG. 10 is a block diagram illustrating a device for computing transform values.

FIG. 10 is a block diagram illustrating a device for computing transform values. The device 1002 may include an input module 1006, a window module 1010, and/or a transform module 1014. The input module 1006 may be adapted to receive an audio signal 1004 and provide time-domain input values 1008 representing the audio signal. The window module 1010 may produce a modified windowing function that merges factors from the transform operation and the windowing operation to obtain piece-wise symmetric windowing factors. For instance, the window module 1010 may include a merging module 1018, a factor splitting module 1019, a storage module 1020, and/or a windowing function 1022. The merging module 1018 may perform the function of merging factors from the transform operation and the windowing operation to obtain piece-wise symmetric windowing factors. For example, the cosine factors 306 (FIG. 3) may be merged with other windowing function factors. The factor splitting module 1019 may then obtain a subset of the piece-wise symmetric windowing factors (as illustrated in FIG. 9). The storage module 1020 may then store the subset of the piece-wise symmetric windowing factors from which a complete set of the piece-wise symmetric windowing factors can be reconstructed. For instance, the subset of the piece-wise symmetric windowing factors may include at least half of the unique factors for each piece-wise symmetric set of windowing factors. The windowing module 1010 (via windowing function 1022) may be further configured to apply the complete set of reconstructed piece-wise symmetric windowing factors to the input values 1008 prior to transforming the input values (thereby obtaining the windowed input values 1012).

The transform module 1014 may transform the windowed input values 1012 into spectral coefficients 1016 using, for example, a Modified Discrete Cosine Transform (MDCT).

The MDCT may be recursively split into at least one of a Discrete Cosine Transform type IV (DCT-IV), a Discrete Cosine Transform type II (DCT-II), or both the DCT-IV and DCT-II, where each such transform is of smaller dimension than the MDCT, wherein at least some multiplication operations of the MDCT are merged with a prior windowing operation applied to the input values. In one example, the DCT-II may be a 5-point transform that implements MDCTs of different sizes, such as the DCT-II illustrated in FIG. 5. The MDCT may implement at least two of 320, 160, 80, 40-point transforms using the same core DCT-II. The components of the device 1002 may be implemented as hardware, software, and/or a combination of the thereof. For example, the device 1002 may be a processor and/or circuit that implements the functions of its components or modules.

Figure 11:
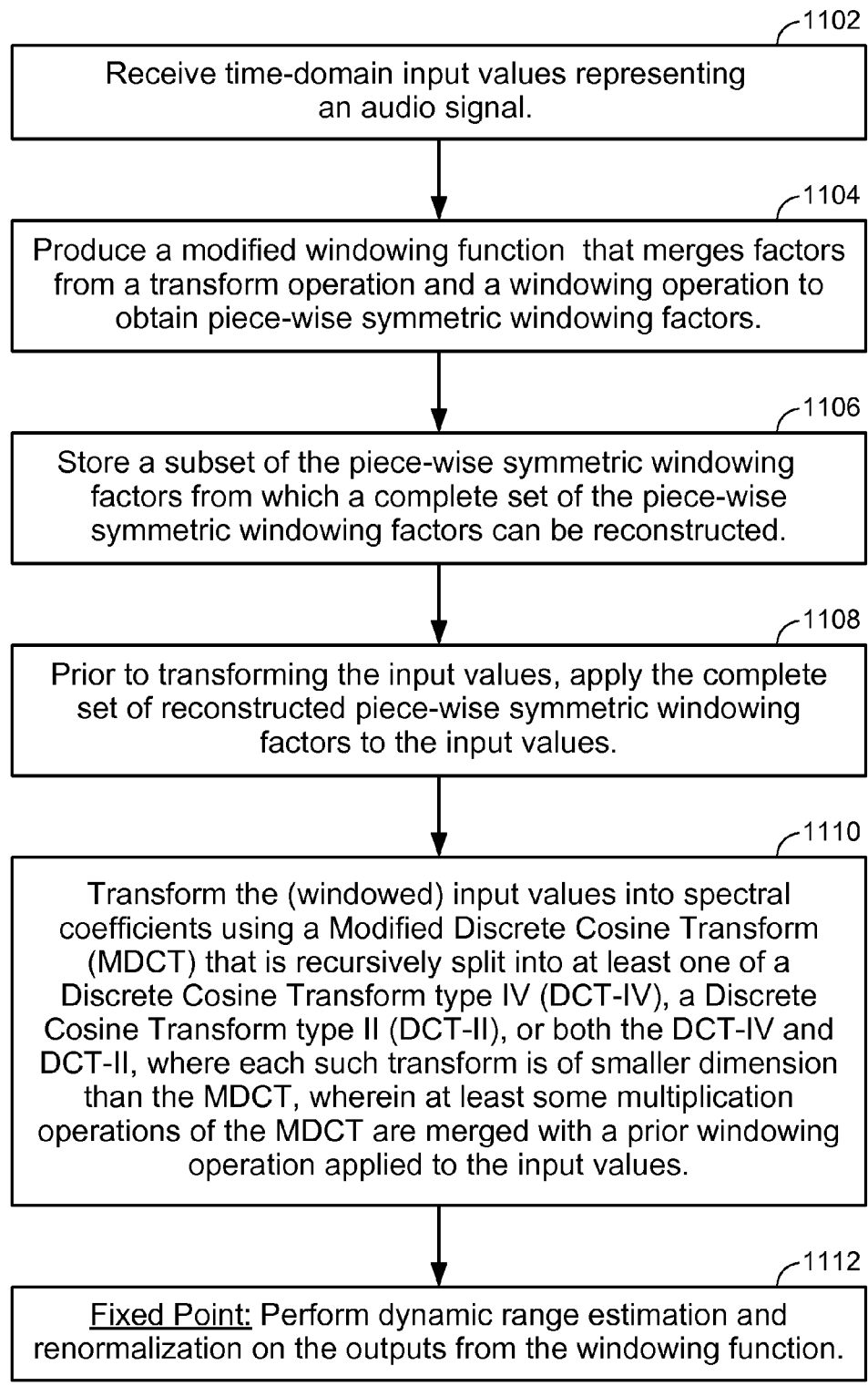
FIG. 11 illustrates an example of a method for encoding a signal using a MDCT transform based on a core DCT-II transform.

FIG. 11 illustrates an example of a method for encoding a signal using a MDCT transform based on a core DCT-II transform. Time-domain input values representing an audio signal may be received 1102. For instance, an analog audio signal (e.g., voice signal, music, video, etc.) may be sampled to obtain the input values.

In one example, a modified windowing function maybe produced that merges factors from a transform operation and a windowing operation to obtain piece-wise symmetric windowing factors 1104. A subset of the piece-wise symmetric windowing factors is then stored from which a complete set of the piece-wise symmetric windowing factors can be reconstructed 1106. Prior to transforming the input values, the complete set of reconstructed piece-wise symmetric windowing factors may be applied to the input values 1108. For instance, the cosine factors illustrated in FIG. 3 (reference 306) for the MDCT transform may be applied at the prior windowing operation. The subset of the piece-wise symmetric windowing factors may include at least half of the unique factors for each piece-wise symmetric set of windowing factors.

The resulting (windowed) input values (from the windowing operation) may be transformed into spectral coefficients using a Modified Discrete Cosine Transform (MDCT) that is recursively split into at least one of a Discrete Cosine Transform type IV (DCT-IV), a Discrete Cosine Transform type II (DCT-II), or both the DCT-IV and DCT-II, where each such transform is of smaller dimension than the MDCT, wherein at least some multiplication operations of the MDCT are merged with a prior windowing operation applied to the input values 1110. For example, the MDCT may be implemented based on a Discrete Cosine Transform type IV (DCT-IV) which is implemented based on the core DCT-II (e.g., the transform in FIG. 5). The DCT-II may be a 5-point transform that implements MDCTs of different sizes. For instance, the MDCT may implement at least two of 320, 160, 80, 40-point transforms using the same core DCT-II. The core DCT-II may include five (5) multiplication operations and 12 additions or four (4) multiplication operations and 13 additions.

Additionally, for fixed-point implementations, dynamic range estimation and/or renormalization may be performed on the outputs from the windowing function 1112. In one example, renormalization may be done by shifting all intermediate values left (in a buffer) reserving at least one bit as headroom to prevent overflows in subsequent stages in the transform.

Example of Decoding Using IMDCT Transform

Figure 12:
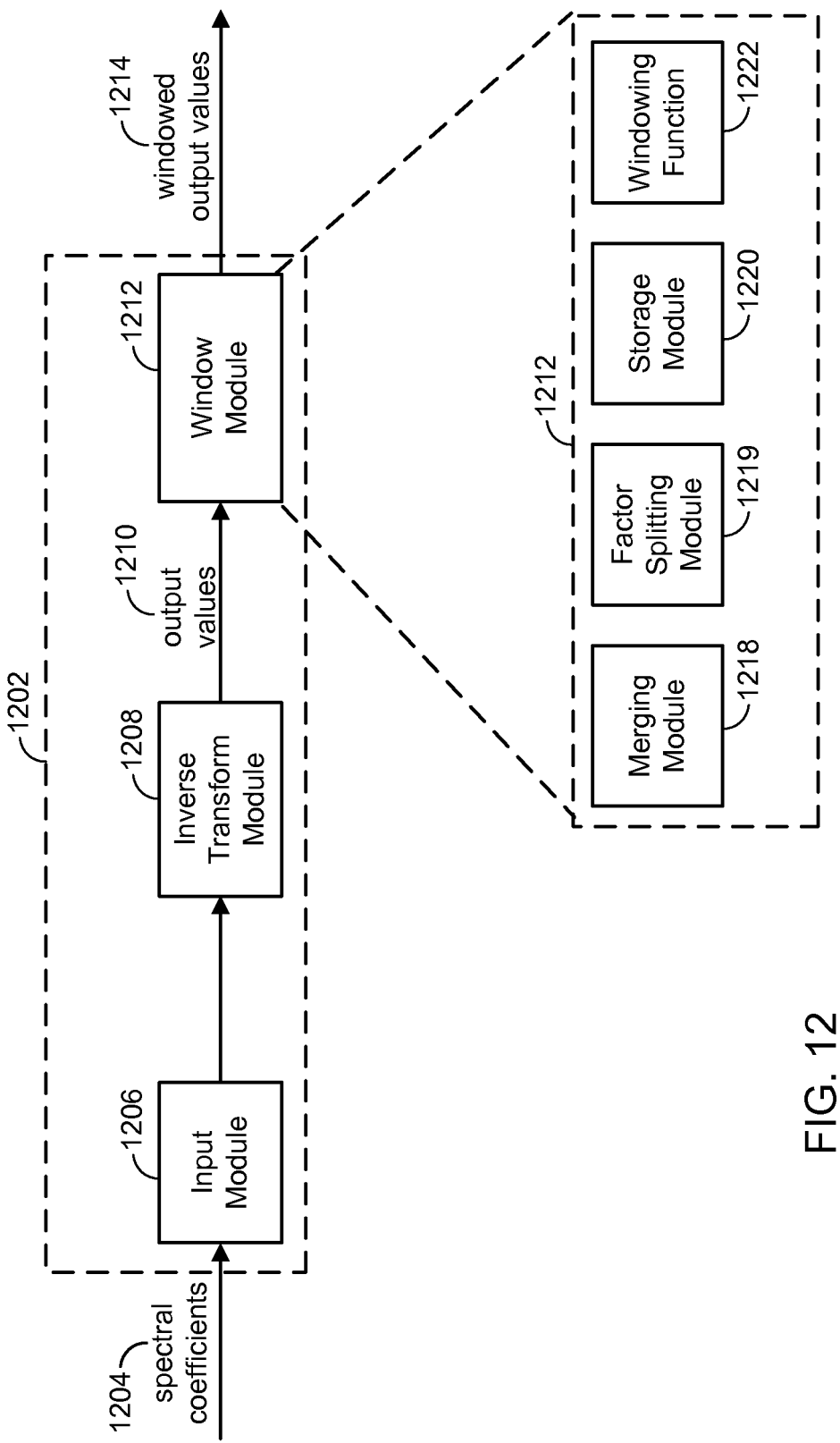
FIG. 12 is a block diagram illustrating a device for computing transform values.

FIG. 12 is a block diagram illustrating a device for computing transform values. The device 1202 may include an input module 1206, an inverse transform module 1208, and/or a window module 1212. The inverse transform module 1208 may be adapted to transform the spectral coefficients 1204 into output values 1210. For example, the inverse transform module may transforming the spectral coefficients into time-domain output values 1210 using an Inverse Modified Discrete Cosine Transform (IMDCT) that is recursively split into at least one of an Inverse Discrete Cosine Transform type IV (IDCT-IV), an Inverse Discrete Cosine Transform type II (IDCT-II), or both the IDCT-IV and IDCT-II, where each such inverse transform is of smaller dimension than the IMDCT, wherein at least some multiplication operations of the IMDCT are merged with a subsequent windowing operation 1212 applied to the output values 1210.

The window module 1212 may produce a modified windowing function that merges factors from the transform operation and the windowing function to obtain piece-wise symmetric windowing factors. For instance, the window module 1212 may include a merging module 1218, a factor splitting module 1219, a storage module 1220, and/or a windowing function 1222. The merging module 1218 may perform the function of merging factors from the inverse transform operation and the windowing operation to obtain piece-wise symmetric windowing factors. For example, the cosine factors 406 (FIG. 4) may be merged with other windowing function factors. The factor splitting module 1219 may then obtain a subset of the piece-wise symmetric windowing factors (as illustrated in FIG. 9). The storage module 1220 may then store the subset of the piece-wise symmetric windowing factors from which a complete set of the piece-wise symmetric windowing factors can be reconstructed. For instance, the subset of the piece-wise symmetric windowing factors may include at least half of the unique factors for each piece-wise symmetric set of windowing factors. The window module 1212 (via windowing function 1222) may be further configured to apply the complete set of reconstructed piece-wise symmetric windowing factors to the output values 1210 after the transformation of the spectral coefficients 1204 (thereby obtaining the windowed output values 1214). The components of the device 1202 may be implemented as hardware, software, and/or a combination of the thereof. For example, the device 1202 may be a processor and/or circuit that implements the functions of its components or modules.

Figure 13:
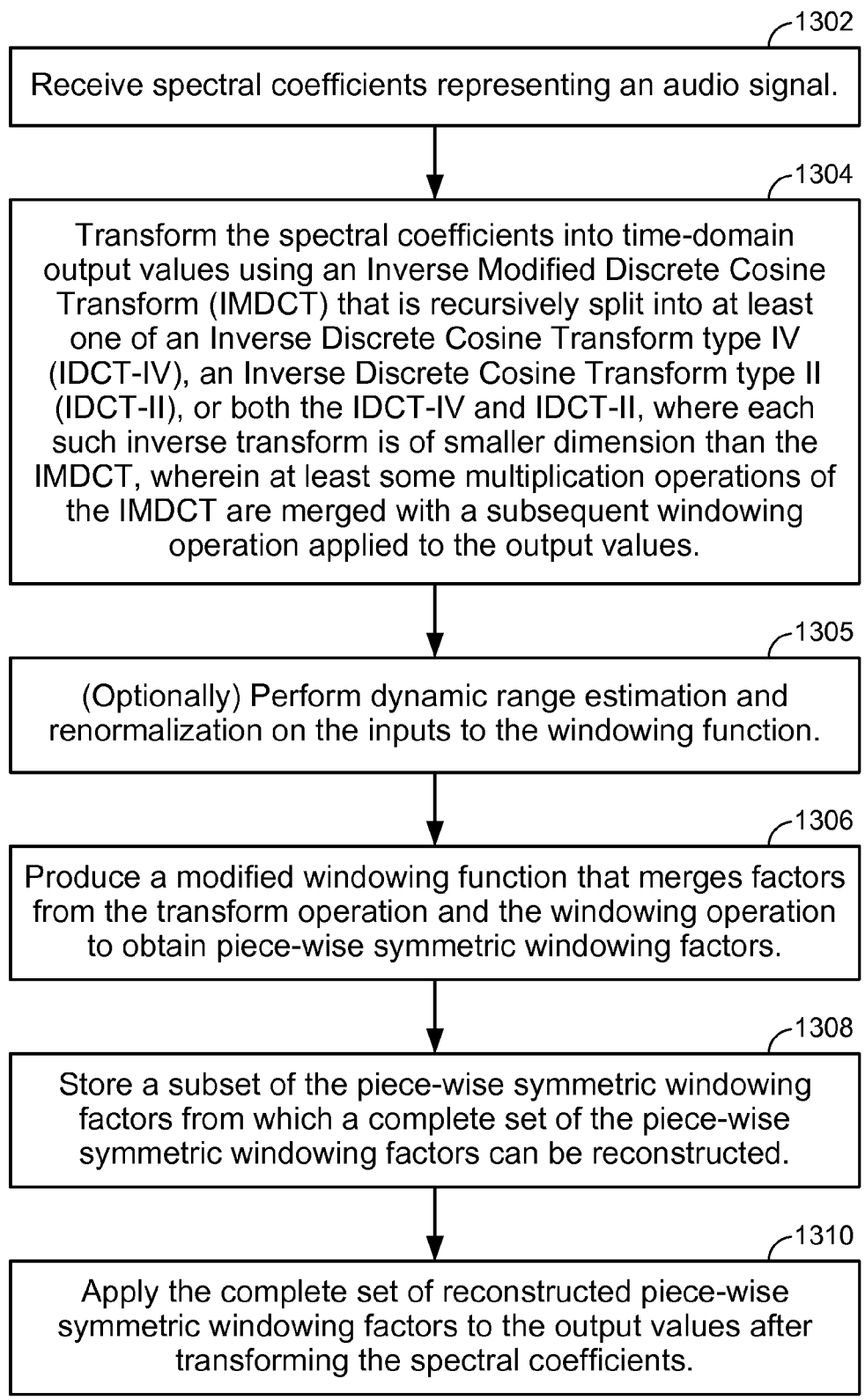
FIG. 13 illustrates an example of a method for decoding a signal using an IMDCT transform based on a core IDCT-II transform.

FIG. 13 illustrates an example of a method for decoding a signal using an IMDCT transform based on a core IDCT-II transform. Spectral coefficients representing an audio signal are received or obtained 1302. The spectral coefficients may be transformed into time-domain output values using an Inverse Modified Discrete Cosine Transform (IMDCT) that is recursively split into at least one of an Inverse Discrete Cosine Transform type IV (IDCT-IV), an Inverse Discrete Cosine Transform type II (IDCT-II), or both the IDCT-IV and IDCT-II, where each such inverse transform is of smaller dimension than the IMDCT, wherein at least some multiplication operations of the IMDCT are merged with a subsequent windowing operation applied to the output values 1104. The core IDCT-II may be a 5-point inverse transform that implements IMDCTs of different sizes. The IMDCT implements at least two of 320, 160, 80, 40-point inverse transforms using the same core IDCT-II. In various implementations, the IDCT-II may include at most five (5) multiplications operations and 12 additions or four (4) multiplications operations and 13 additions.

Additionally, a modified windowing function may be produced that merges factors from the transform operation and the windowing operation to obtain piece-wise symmetric windowing factors 1106. A subset of the piece-wise symmetric windowing factors may be stored from which a complete set of the piece-wise symmetric windowing factors can be reconstructed 1308. The stored subset of the piece-wise symmetric windowing factors may include at least half of the unique factors for each piece-wise symmetric set of windowing factors. The complete set of reconstructed piece-wise symmetric windowing factors may then be applied to the output values after transforming the spectral coefficients 1310.

Optionally, for fixed-point implementations, dynamic range estimation and renormalization may be performed on the inputs to the windowing function 1305. The dynamic range estimation and renormalization may be performed after all recursively processed inter-coefficient subtractions in MDCT to DCT-IV mapping. Renormalization may be done by shifting all intermediate values left (bit-shifting), reserving at least two bits as headroom to prevent overflows in subsequent transform stages. To compensate for dynamic range expansion, all intermediate stages in the IMDCT transform may perform right shifting of their resulting quantities by one bit.

Storage of Piece-wise Symmetric Windowing Factors

Figure 14:
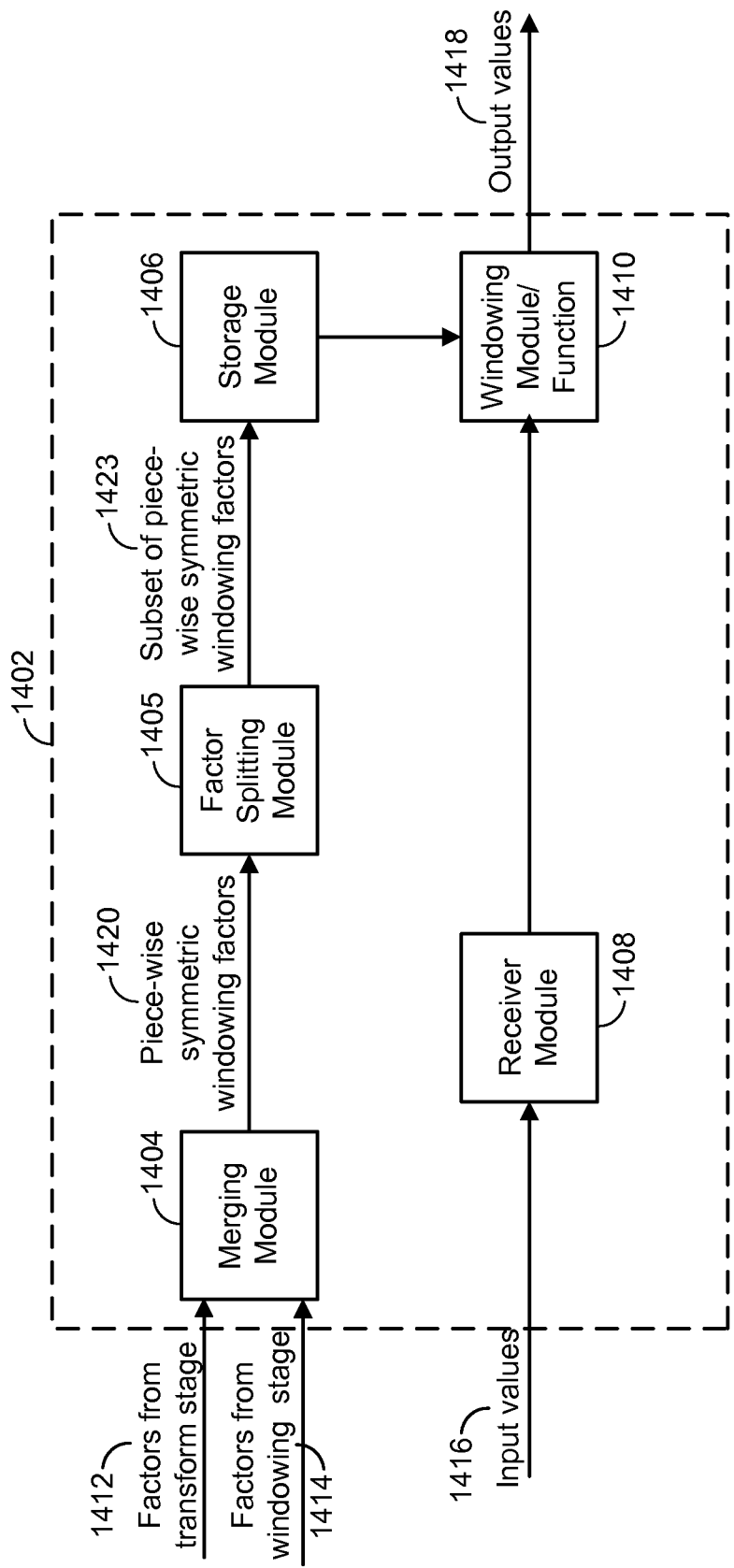
FIG. 14 is a block diagram illustrating a device for performing windowing operations.

FIG. 14 is a block diagram illustrating a device for performing windowing operations. The device 1402 may include a merging module 1404, a factor splitting module 1405, a storage module 1406, a receiver module 1408, and/or a windowing module 1410. The merging module 1404 may be configure or produce a modified windowing function that merges factors from a transform stage and a windowing stage 1412 and 1414 to obtain piece-wise symmetric windowing factors 1420. A factor splitting module 1405 may split the complete set of obtain piece-wise symmetric windowing factors 1420 into a subset of piece-wise symmetric windowing factors 1423. Such splitting of factors is illustrated in FIG. 9 for example. The storage module 1406 may store the subset of the piece-wise symmetric windowing factors 1423 from which the complete set of the piece-wise symmetric windowing factors 1420 can be reconstructed. The receiver module 1408 may receive input values 1416 representing an audio signal. The windowing module 1410 may apply the (reconstructed) complete set of reconstructed piece-wise symmetric windowing factors to the input values 1416 and provide windowed output values 1418. Consequently, because only a sub-set of windowing factors are stored, this save storage space and makes the windowing device more efficient. The components of the device 1402 may be implemented as hardware, software, and/or a combination of the thereof. For example, the device 1402 may be a processor and/or circuit that implements the functions of the components or modules.

Figure 15:
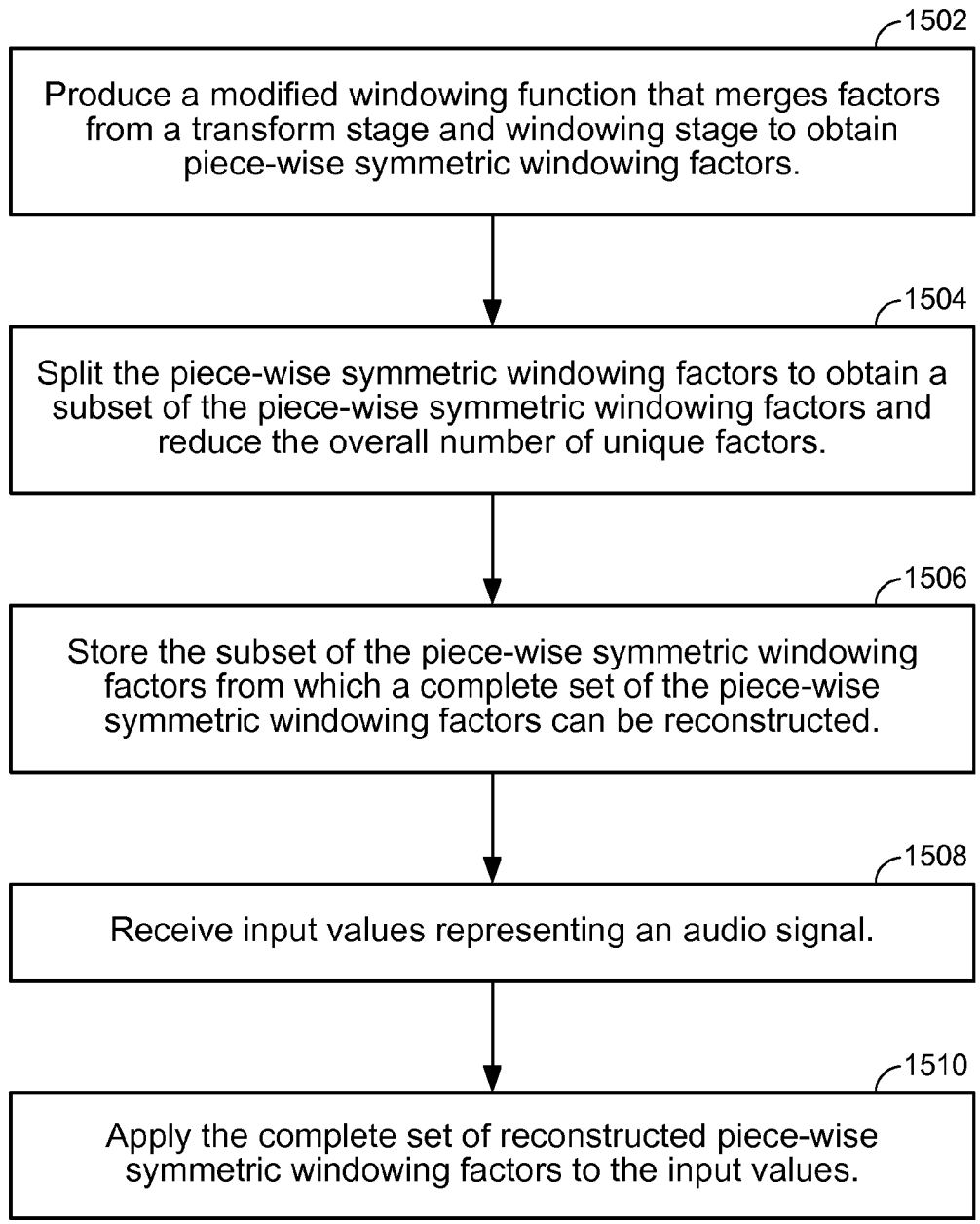
FIG. 15 illustrates an example of a method for performing a windowing operation.

FIG. 15 illustrates an example of a method for performing a windowing operation. A modified windowing function may be produced that merges factors from a transform stage and windowing stage to obtain piece-wise symmetric windowing factors 1502. The set of piece-wise symmetric windowing factors may be split to obtain a subset of piece-wise symmetric windowing factors and reduce the overall number of unique factors 1504. The subset of the piece-wise symmetric windowing factors are stored from which a complete set of the piece-wise symmetric windowing factors can be reconstructed 1506. Input values may be received representing an audio signal 1508. The complete set of reconstructed piece-wise symmetric windowing factors may be applied to the input values and provide windowed output values 1510. The subset of the piece-wise symmetric windowing factors may include at least half of the unique factors for each piece-wise symmetric set of windowing factors.

In one example, the windowing stage occurs before the transform stage. In such case, the transform stage may implement a Modified Discrete Cosine Transform (MDCT) that is recursively split into at least one of a Discrete Cosine Transform type IV (DCT IV), a Discrete Cosine Transform type IV (DCT IV), or both the DCT IV and DCT II, where each such transform is of smaller dimension than the MDCT. The transform stage factors may be, for example, the cosine factors of FIG. 3.

In another example, the windowing stage may occur after the transform stage. The transform stage may implement an Inverse Modified Discrete Cosine Transform (IMDCT) that is recursively split into at least one of an Inverse Discrete Cosine Transform type IV (IDCT IV), an Inverse Discrete Cosine Transform type IV (IDCT IV), or both the IDCT IV and IDCT II, where each such transform is of smaller dimension than the IMDCT. The transform stage factors may be, for example, the cosine factors of FIG. 4.

In addition to the examples provided herein, the algorithms described herein that implement decimated transforms may be used to implement any other transform that is a multiple of two. Additionally, it should be noted that the techniques described herein may be applied to various types of signals, including audio, voice, video, data, etc.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits and algorithm steps described herein may be implemented or performed as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

When implemented in hardware, various examples may employ a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

When implemented in software, various examples may employ firmware, middleware or microcode. The program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more examples herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Software may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

One or more of the components, steps, and/or functions illustrated in FIGS. 1, 2, 3, 4, 5, 6, 7, 8, 9, 10, 11, 12, 13, 14, and/or 15 may be rearranged and/or combined into a single component, step, or function or embodied in several components, steps, or functions. Additional elements, components, steps, and/or functions may also be added. The apparatus, devices, and/or components illustrated in FIGS. 1, 2, 10, 12, and 14 may be configured or adapted to perform one or more of the methods, features, or steps described in FIGS. 3-9, 11, 13, and 15. The algorithms described herein may be efficiently implemented in software and/or embedded hardware for example.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method of computing transform values, comprising:
   receiving time-domain input values representing an audio signal; and
   transforming the input values into spectral coefficients using a Modified Discrete Cosine Transform (MDCT) that is recursively split into at least one of a Discrete Cosine Transform type IV (DCT-IV), a Discrete Cosine Transform type II (DCT-II), or both a DCT-IV and a DCT-II, where each such transform is of smaller dimension than the MDCT, wherein at least some multiplication operations of the MDCT are merged with a prior windowing operation applied to the input values.

2. The method of claim 1, wherein the DCT-II is a 5-point transform that can implement MDCTs of different sizes.

3. The method of claim 1, wherein the DCT-II includes the transform in FIG. 5.

4. The method of claim 1, wherein the MDCT implements at least two of 320, 160, 80, 40-point transforms using the same DCT-II.

5. The method of claim 1, wherein the DCT-II includes at most five (5) multiplication operations.

6. The method of claim 1, further comprising:
   producing a modified windowing function that merges factors from the transform operation and the windowing operation to obtain piece-wise symmetric windowing factors; and
   storing a subset of the piece-wise symmetric windowing factors from which a complete set of the piece-wise symmetric windowing factors can be reconstructed.

7. The method of claim 6, further comprising:
   prior to transforming the input values, applying the complete set of reconstructed piece-wise symmetric windowing factors to the input values.

8. The method of claim 6, wherein the subset of the piece-wise symmetric windowing factors includes at least half of the unique factors for each piece-wise symmetric set of windowing factors.

9. The method of claim 1, further comprising:
performing dynamic range estimation and renormalization on the outputs from the windowing function.

10. A device for computing transform values, comprising:
an input module to receive an audio signal and provide time-domain input values representing the audio signal; and
a transform module to transform the input values into spectral coefficients using a Modified Discrete Cosine Transform (MDCT) that is recursively split into at least one of a Discrete Cosine Transform type IV (DCT-IV), a Discrete Cosine Transform type II (DCT-II), or both a DCT-IV and a DCT-II, where each such transform is of smaller dimension than the MDCT, wherein at least some multiplication operations of the MDCT are merged with a prior windowing operation applied to the input values.

11. The device of claim 10, wherein the DCT-II is a 5-point transform that implements MDCTs of different sizes.

12. The device of claim 10, wherein the DCT-II includes the transform in FIG. 5.

13. The device of claim 10, wherein the MDCT implements at least two of 320, 160, 80, 40-point transforms using the same core DCT-II.

14. The device of claim 10, further comprising:
a windowing module for producing a modified windowing function that merges factors from the transform operation and the windowing operation to obtain piece-wise symmetric windowing factors; and
a storage module for storing a subset of the piece-wise symmetric windowing factors from which a complete set of the piece-wise symmetric windowing factors can be reconstructed.

15. The device of claim 14, wherein the windowing module is further configured to apply the complete set of reconstructed piece-wise symmetric windowing factors to the input values prior to transforming the input values.

16. The device of claim 14, wherein the subset of the piece-wise symmetric windowing factors includes at least half of the unique factors for each piece-wise symmetric set of windowing factors.

17. A device for computing transform values, comprising:
means for receiving time-domain input values representing an audio signal; and
means for transforming the input values into spectral coefficients using a Modified Discrete Cosine Transform (MDCT) that is recursively split into at least one of a Discrete Cosine Transform type IV (DCT-IV), a Discrete Cosine Transform type II (DCT-II), or both a DCT-IV and a DCT-II, where each such transform is of smaller dimension than the MDCT, wherein at least some multiplication operations of the MDCT are merged with a prior windowing operation applied to the input values.

18. The device of claim 17, wherein the DCT-II is a 5-point transform that can implement MDCTs of different sizes.

19. The device of claim 17, further comprising:
means for producing a modified windowing function that merges factors from the transform operation and the windowing operation to obtain piece-wise symmetric windowing factors;
means for storing a subset of the piece-wise symmetric windowing factors from which a complete set of the piece-wise symmetric windowing factors can be reconstructed; and
means for applying the complete set of reconstructed piece-wise symmetric windowing factors to the input values prior to transforming the input values.

20. A circuit for computing transform values, wherein the circuit is adapted to:
receive time-domain input values representing an audio signal; and
transform the input values into spectral coefficients using a Modified Discrete Cosine Transform (MDCT) that is recursively split into at least one of a Discrete Cosine Transform type IV (DCT-IV), a Discrete Cosine Transform type II (DCT-II), or both a DCT-IV and a DCT-II, where each such transform is of smaller dimension than the MDCT, wherein at least some multiplication operations of the MDCT are merged with a prior windowing operation applied to the input values.

21. A non-transitory computer-readable medium comprising instructions for computing transform values, which when executed by a processor causes the processor to:
receive time-domain input values representing an audio signal; and
transform the input values into spectral coefficients using a Modified Discrete Cosine Transform (MDCT) that is recursively split into at least one of a Discrete Cosine Transform type IV (DCT-IV), a Discrete Cosine Transform type II (DCT-II), or both a DCT-IV and a DCT-II, where each such transform is of smaller dimension than the MDCT, wherein at least some multiplication operations of the MDCT are merged with a prior windowing operation applied to the input values.

22. A method of providing a decoder, comprising:
receiving spectral coefficients representing an audio signal; and
transforming the spectral coefficients into time-domain output values using an Inverse Modified Discrete Cosine Transform (IMDCT) that is recursively split into at least one of an Inverse Discrete Cosine Transform type IV (IDCT-IV), an Inverse Discrete Cosine Transform type II (IDCT-II), or both an IDCT-IV and an IDCT-II, where each such inverse transform is of smaller dimension than the IMDCT, wherein at least some multiplication operations of the IMDCT are merged with a subsequent windowing operation applied to the output values.

23. The method of claim 22, wherein the IDCT-II is a 5-point inverse transform that implements IMDCTs of different sizes.

24. The method of claim 22, wherein the IDCT-II includes the inverse transform in FIG. 6.

25. The method of claim 22, wherein the IMDCT implements at least two of 320, 160, 80, 40-point inverse transforms using the same core IDCT-II.

26. The method of claim 22, further comprising:
producing a modified windowing function that merges factors from the transform operation and the windowing operation to obtain piece-wise symmetric windowing factors; and
storing a subset of the piece-wise symmetric windowing factors from which a complete set of the piece-wise symmetric windowing factors can be reconstructed.

27. The method of claim 26, further comprising:
applying the complete set of reconstructed piece-wise symmetric windowing factors to the output values after transforming the spectral coefficients.

28. The method of claim 26, wherein the subset of the piece-wise symmetric windowing factors includes at least half of the unique factors for each piece-wise symmetric set of windowing factors.

29. The method of claim 26, further comprising:
performing dynamic range estimation and renormalization on the outputs from the windowing function.

30. A device for computing transform values, comprising:
an input module for receiving spectral coefficients representing an audio signal; and
an inverse transform module for transforming the spectral coefficients into time-domain output values using an Inverse Modified Discrete Cosine Transform (IMDCT) that is recursively split into at least one of an Inverse Discrete Cosine Transform type IV (IDCT-IV), an Inverse Discrete Cosine Transform type II (IDCT-II), or both an IDCT-IV and an IDCT-II, where each such inverse transform is of smaller dimension than the IMDCT, wherein at least some multiplication operations of the IMDCT are merged with a subsequent windowing operation applied to the output values.

31. The device of claim 30, wherein the IDCT-II is a 5-point inverse transform that implements IMDCTs of different sizes.

32. The device of claim 30, further comprising:
a merging module for producing a modified windowing function that merges factors from the transform operation and the windowing operation to obtain piece-wise symmetric windowing factors;
a storage module for storing a subset of the piece-wise symmetric windowing factors from which a complete set of the piece-wise symmetric windowing factors can be reconstructed; and
a windowing module applying the complete set of reconstructed piece-wise symmetric windowing factors to the output values after transforming the spectral coefficients.

33. A device for computing transform values, comprising:
means for receiving spectral coefficients representing an audio signal; and
means for transforming the spectral coefficients into time-domain output values using an Inverse Modified Discrete Cosine Transform (IMDCT) that is recursively split into at least one of an Inverse Discrete Cosine Transform type IV (IDCT-IV), an Inverse Discrete Cosine Transform type II (IDCT-II), or both an IDCT-IV and an IDCT-II, where each such inverse transform is of smaller dimension than the IMDCT, wherein at least some multiplication operations of the IMDCT are merged with a subsequent windowing operation applied to the output values.

34. A circuit for computing transform values, wherein the circuit is adapted to:
receive spectral coefficients representing an audio signal; and
transform the spectral coefficients into time-domain output values using an Inverse Modified Discrete Cosine Transform (IMDCT) that is recursively split into at least one of an Inverse Discrete Cosine Transform type IV (IDCT-IV), an Inverse Discrete Cosine Transform type II (IDCT-II), or both an IDCT-IV and an IDCT-II, where each such inverse transform is of smaller dimension than the IMDCT, wherein at least some multiplication operations of the IMDCT are merged with a subsequent windowing operation applied to the output values.

35. A non-transitory computer-readable medium comprising instructions for computing transform values, which when executed by a processor causes the processor to:
receive spectral coefficients representing an audio signal; and
transform the spectral coefficients into time-domain output values using an Inverse Modified Discrete Cosine Transform (IMDCT) that is recursively split into at least one of an Inverse Discrete Cosine Transform type IV (IDCT-IV), an Inverse Discrete Cosine Transform type II (IDCT-II), or both an IDCT-IV and an IDCT-II, where each such inverse transform is of smaller dimension than the IMDCT, wherein at least some multiplication operations of the IMDCT are merged with a subsequent windowing operation applied to the output values.

36. A method of performing a windowing operation as part of a signal encoding or decoding process, comprising:
producing a modified windowing function that merges factors from a transform stage and windowing stage, of the signal encoding or decoding process, to obtain piece-wise symmetric windowing factors; and
storing a subset of the piece-wise symmetric windowing factors from which a complete set of the piece-wise symmetric windowing factors can be reconstructed.

37. The method of claim 36, further comprising:
receiving input values representing an audio signal;
applying the complete set of reconstructed piece-wise symmetric windowing factors to the input values and provide windowed output values.

38. The method of claim 36, wherein the subset of the piece-wise symmetric windowing factors includes at least half of the unique factors for each piece-wise symmetric set of windowing factors.

39. The method of claim 36, further comprising:
splitting the piece-wise symmetric windowing factors to obtain the subset of the piece-wise symmetric windowing factors and reduce the overall number of unique factors.

40. The method of claim 36, wherein the windowing stage occurs before the transform stage.

41. The method of claim 40, wherein the transform stage implements a Modified Discrete Cosine Transform (MDCT) that is recursively split into at least one of a Discrete Cosine Transform type IV (DCT IV), a Discrete Cosine Transform type IV (DCT IV), or both the DCT IV and DCT II, where each such transform is of smaller dimension than the MDCT.

42. The method of claim 40, wherein the transform stage factors are the cosine factors of FIG. 3.

43. The method of claim 36, wherein the windowing stage occurs after the transform stage.

44. The method of claim 43, wherein the transform stage implements an Inverse Modified Discrete Cosine Transform (IMDCT) that is recursively split into at least one of an Inverse Discrete Cosine Transform type IV (IDCT IV), an Inverse Discrete Cosine Transform type IV (IDCT IV), or both the IDCT IV and IDCT II, where each such transform is of smaller dimension than the IMDCT.

45. The method of claim 43, wherein the transform stage factors are the cosine factors of FIG. 4.

46. A device for performing windowing operations as part of a signal encoding or decoding process, comprising:
a merging module for producing a modified windowing function that merges factors from a transform stage and a windowing stage, of the signal encoding or decoding process, to obtain piece-wise symmetric windowing factors; and a storage module for storing a subset of the piece-wise symmetric windowing factors from which a complete set of the piece-wise symmetric windowing factors can be reconstructed.

47. The device of claim 46, further comprising:

a receiver module for receiving input values representing an audio signal;

a windowing module for applying the complete set of reconstructed piece-wise symmetric windowing factors to the input values and provide windowed output values.

48. A device for performing windowing operations as part of a signal encoding or decoding process, comprising:

means for producing a modified windowing function that merges factors from a transform stage and windowing stage, of the signal encoding or decoding process, to obtain piece-wise symmetric windowing factors; and means for storing a subset of the piece-wise symmetric windowing factors from which a complete set of the piece-wise symmetric windowing factors can be reconstructed.

49. A circuit for performing windowing operations as part of a signal encoding or decoding process, wherein the circuit is adapted to:

produce a modified windowing function that merges factors from a transform stage and windowing stage, of the signal encoding or decoding process, to obtain piece-wise symmetric windowing factors; and store a subset of the piece-wise symmetric windowing factors from which a complete set of the piece-wise symmetric windowing factors can be reconstructed.

50. A non-transitory computer-readable medium comprising instructions for performing windowing operations as part of a signal encoding or decoding process, which when executed by a processor causes the processor to:

produce a modified windowing function that merges factors from a transform stage and windowing stage, of the signal encoding or decoding process, to obtain piece-wise symmetric windowing factors; and store a subset of the piece-wise symmetric windowing factors from which a complete set of the piece-wise symmetric windowing factors can be reconstructed.

* * * * *